US012330446B2

(12) United States Patent
Goodwin, Jr. et al.

(10) Patent No.: US 12,330,446 B2
(45) Date of Patent: Jun. 17, 2025

(54) MODULAR TOOLBOX DESIGNED AND ORGANIZED FOR PAINTING TOOLS

(71) Applicant: SWIMC LLC, Cleveland, OH (US)

(72) Inventors: Edward Ray Goodwin, Jr., Westlake, OH (US); Sharad Gaurav, Avon, OH (US); Charles T. Buckel, Jr., Valley City, OH (US); Connie M. McKinney, Hudson, OH (US); Michael C. Lambertson, Jr., Aurora, OH (US)

(73) Assignee: SWIMC LLC, Cleveland, OH (US)

( * ) Notice: Subject to any disclaimer, the term of this patent is extended or adjusted under 35 U.S.C. 154(b) by 164 days.

(21) Appl. No.: 17/917,482

(22) PCT Filed: Apr. 30, 2021

(86) PCT No.: PCT/US2021/030195
§ 371 (c)(1),
(2) Date: Oct. 6, 2022

(87) PCT Pub. No.: WO2022/231623
PCT Pub. Date: Nov. 3, 2022

(65) Prior Publication Data

US 2024/0025204 A1 Jan. 25, 2024

Related U.S. Application Data

(60) Provisional application No. 62/704,254, filed on Apr. 30, 2020.

(51) Int. Cl.
*B44D 3/12* (2006.01)
*B44D 3/14* (2006.01)
(Continued)

(52) U.S. Cl.
CPC ............... *B44D 3/125* (2013.01); *B44D 3/14* (2013.01); *B65D 21/0217* (2013.01);
(Continued)

(58) Field of Classification Search
CPC ....... B44D 3/125; B44D 3/14; B65D 21/0217
See application file for complete search history.

(56) References Cited

U.S. PATENT DOCUMENTS 2,936,878 A 5/1960 Claude
5,509,672 A * 4/1996 Offerson .................. B44D 3/00 280/47.35

(Continued)

FOREIGN PATENT DOCUMENTS

CH 672099 A5 10/1989
CN 205928597 U 2/2017

(Continued)

OTHER PUBLICATIONS

Extended European Search Report filed in the corresponding EP Application No. 21936263.9 dated Jun. 10, 2024; 9 pages.

(Continued)

*Primary Examiner* — Brian L Swenson
(74) *Attorney, Agent, or Firm* — Rankin, Hill & Clark LLP

(57) ABSTRACT

In an example embodiment, there is disclosed herein a modular toolbox that is designed and organized for the storage and transport of painting tools. The modular toolbox has modules that are separably stacked and is designed to include storage for painting tools such as, for example, brushes, roller frames, roller covers, putty knives, lights, and an extension pole with compartments allowing for the storage and transport of personal items. In particular embodiments, the modular toolbox includes specific storage capabilities for wet tools so that they can be stored and transported to a different location for cleaning.

21 Claims, 21 Drawing Sheets

(51) Int. Cl.

| | |
|---|---|
| ***B65D 21/02*** | (2006.01) |
| ***B65D 25/10*** | (2006.01) |
| ***B65D 25/20*** | (2006.01) |
| ***B65D 25/28*** | (2006.01) |
| ***B65D 43/02*** | (2006.01) |
| ***B65D 51/24*** | (2006.01) |

(52) U.S. Cl.

CPC ............ *B65D 25/10* (2013.01); *B65D 25/20* (2013.01); *B65D 25/28* (2013.01); *B65D 43/0202* (2013.01); *B65D 51/24* (2013.01); *B65D 2525/287* (2013.01); *B65D 2543/00194* (2013.01)

(56) References Cited

U.S. PATENT DOCUMENTS

| | | | | |
|---|---|---|---|---|
| 6,578,937 | B1 | 6/2003 | Thoman | |
| 8,657,307 | B2 * | 2/2014 | Lifshitz | B25H 3/02 280/47.17 |
| 9,539,722 | B2 | 1/2017 | Martinez et al. | |
| 9,725,209 | B1 | 8/2017 | Ben-Gigi | |
| 10,710,770 | B2 | 7/2020 | Kögel et al. | |
| 10,829,269 | B2 | 11/2020 | Gonitianer et al. | |
| 10,981,696 | B2 | 4/2021 | Brunner et al. | |
| 11,059,631 | B1 | 7/2021 | Brunner et al. | |
| 11,084,322 | B2 | 8/2021 | Arasawa | |
| 11,161,368 | B2 | 11/2021 | Cubillo | |
| 11,440,571 | B2 * | 9/2022 | Wolle | B62B 1/12 |
| 11,753,210 | B1 * | 9/2023 | Spieler, IV | B65D 43/0225 206/350 |
| 2006/0066064 | A1 | 3/2006 | Hardy | |
| 2012/0175278 | A1 * | 7/2012 | Stevens | B44D 3/123 206/373 |
| 2012/0286489 | A1 * | 11/2012 | Bartholomew | B25H 3/02 280/47.131 |
| 2014/0166516 | A1 | 6/2014 | Martinez et al. | |
| 2017/0029169 | A1 * | 2/2017 | Shamp | B65D 21/0233 |
| 2017/0182652 | A1 | 6/2017 | Martinez et al. | |
| 2018/0265256 | A1 * | 9/2018 | Fisher, Jr. | A45C 11/20 |
| 2018/0319207 | A1 * | 11/2018 | Pippus | B44D 3/123 |
| 2019/0002004 | A1 * | 1/2019 | Brunner | B25H 3/023 |
| 2019/0210213 | A1 * | 7/2019 | Omry | B25H 3/02 |
| 2019/0337143 | A1 | 11/2019 | Martinez et al. | |

FOREIGN PATENT DOCUMENTS

| | | | |
|---|---|---|---|
| CN | 108656062 | A | 10/2018 |
| CN | 208514468 | U | 2/2019 |
| DE | 202009015863 | U1 | 4/2010 |
| EP | 0933170 | B1 | 6/2002 |
| GB | 2360277 | B | 9/2001 |
| WO | 2016142935 | A1 | 9/2016 |

OTHER PUBLICATIONS

Machine Translation of C672099; 4 pages.

International Search Report filed in the corresponding PCT Application dated Jun. 8, 2021; 3 Pages.

Written Opinion filed in the corresponding PCT Application dated Jun. 8, 2021; 3 Pages.

Microfilm of the specification and drawings annexed to the written application of Japanese Utility Model Application No. 15760/1986 (Laid-open No. 128900/1987) (Dai Nippon Toryo Co. Ltd) 14.08. 1987 lines 7-15, p. 5, Fig 1.

* cited by examiner

MODULAR TOOLBOX DESIGNED AND ORGANIZED FOR PAINTING TOOLS

CROSS REFERENCE TO RELATED APPLICATIONS

This application claims the benefit under 35 U.S.C. § 119 of U.S. Provisional Application No. 62/704,254 filed Apr. 30, 2020.

TECHNICAL FIELD

The present disclosure relates generally to toolboxes, and toolboxes configured for use with painting supplies.

BACKGROUND

Toolboxes are often employed to carry items. Toolboxes generally have at least one handle for carrying or moving. A user can carry or move the toolbox by grasping the handle with their hand.

SUMMARY OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein a modular toolbox that is designed and organized for the storage and transport of painting tools and paint. In particular embodiments, the modular toolbox includes specific storage capabilities for paint brushes, buckets of paint, extension poles, and removable lighting equipment.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
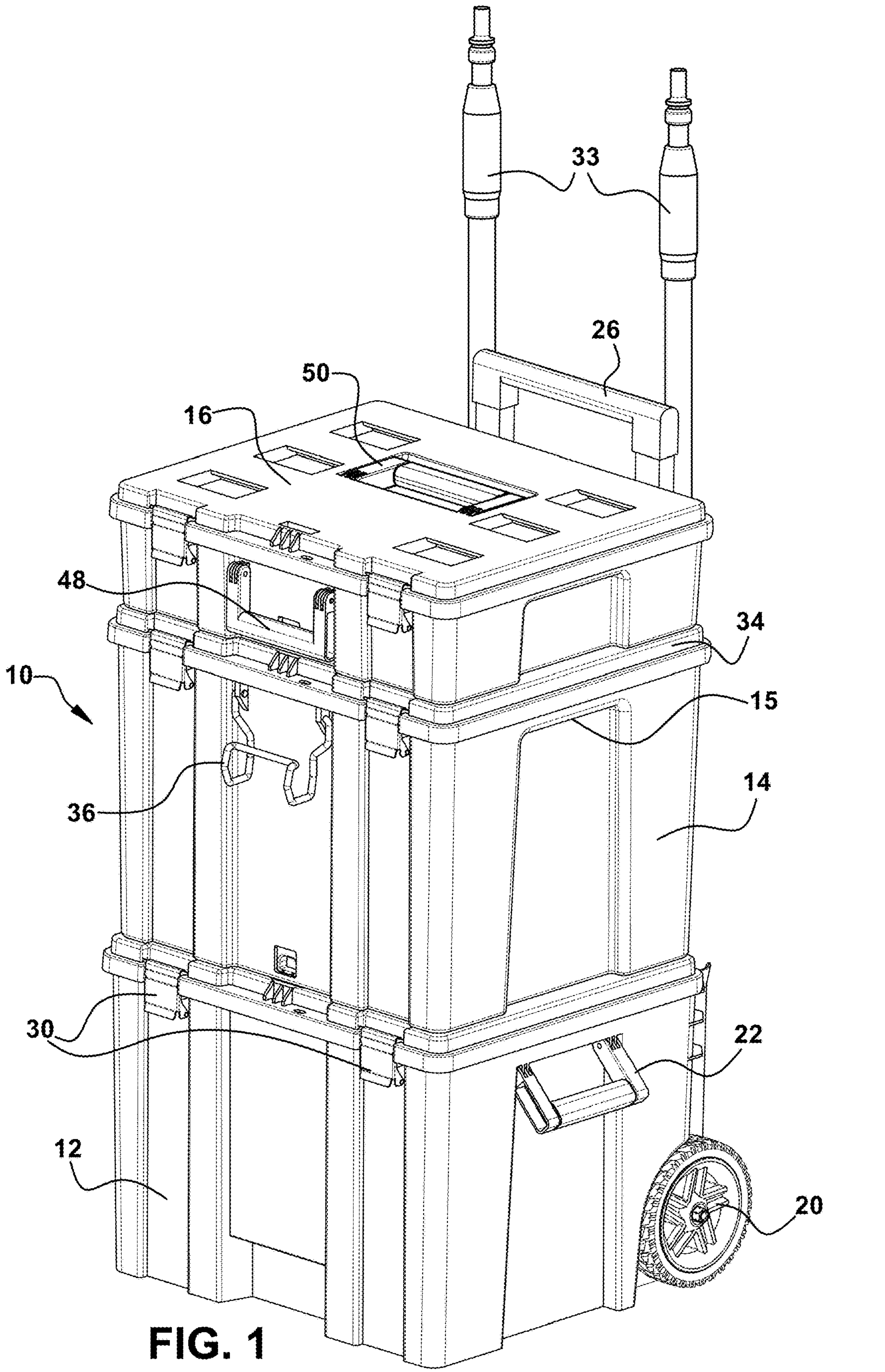
FIG. 1 is a perspective view of a modular toolbox in accordance with an example embodiment.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is disclosed herein a modular toolbox that is designed and organized for the storage and transport of painting tools. The modular toolbox has modules that are separably stacked and designed to include storage for painting tools such as, for example, brushes, roller frames, roller covers, putty knives, lights, and an extension pole with compartments allowing for the storage and transport of personal items. In particular embodiments, the modular toolbox includes specific storage capabilities for wet tools so that they can be stored and transported to a different location for cleaning.

Referring to the figures, FIGS. 1-6 illustrate various exterior views of a modular toolbox 10 in accordance with an example embodiment. The modular toolbox comprises a bottom toolbox module 12, a middle toolbox module 14, and a top toolbox module 16. The modules can be separably stacked on each other, e.g., the middle toolbox module 14 can be stacked on bottom toolbox module 12, and top toolbox module 16 can be stacked on middle toolbox module 14.

Bottom toolbox module 12 comprises wheels 20, bottom side folding handles 22 that are pivotally mounted onto the bottom toolbox module 12, and a bottom lid handle 24. Bottom toolbox module 12 also comprises a telescopically extending handle 26 that can extend above the surface of top toolbox module 16. Thus, the bottom toolbox module can be moved by a user by extending handle 26 and rolling on wheels 20. When all three modules are stacked as illustrated in FIG. 1, the entire stack can likewise be moved by a user exerting force on the extending handle 26. Bottom lid handle 24 is attached to bottom lid 28, and bottom lid 28 is secured by bottom latches 30. Bottom toolbox module 12 also comprises external extension pole holders 32. FIG. 1 shows an example of extension poles 33 inserted into extension pole holders 32 (not shown in FIG. 1, see FIG. 5). Bottom toolbox module 12 can be employed for transport and storage of brushes, paint buckets, or other equipment. In an example embodiment, bottom toolbox module 12 has an external bucket hook similar to hook 36 attached to middle toolbox module 14. In an example embodiment, the wheels 20 are attached to the axle (hidden) by a threadable fastener 94, allowing for the wheels 20 to be removably attached and replaceable.

Figure 2:
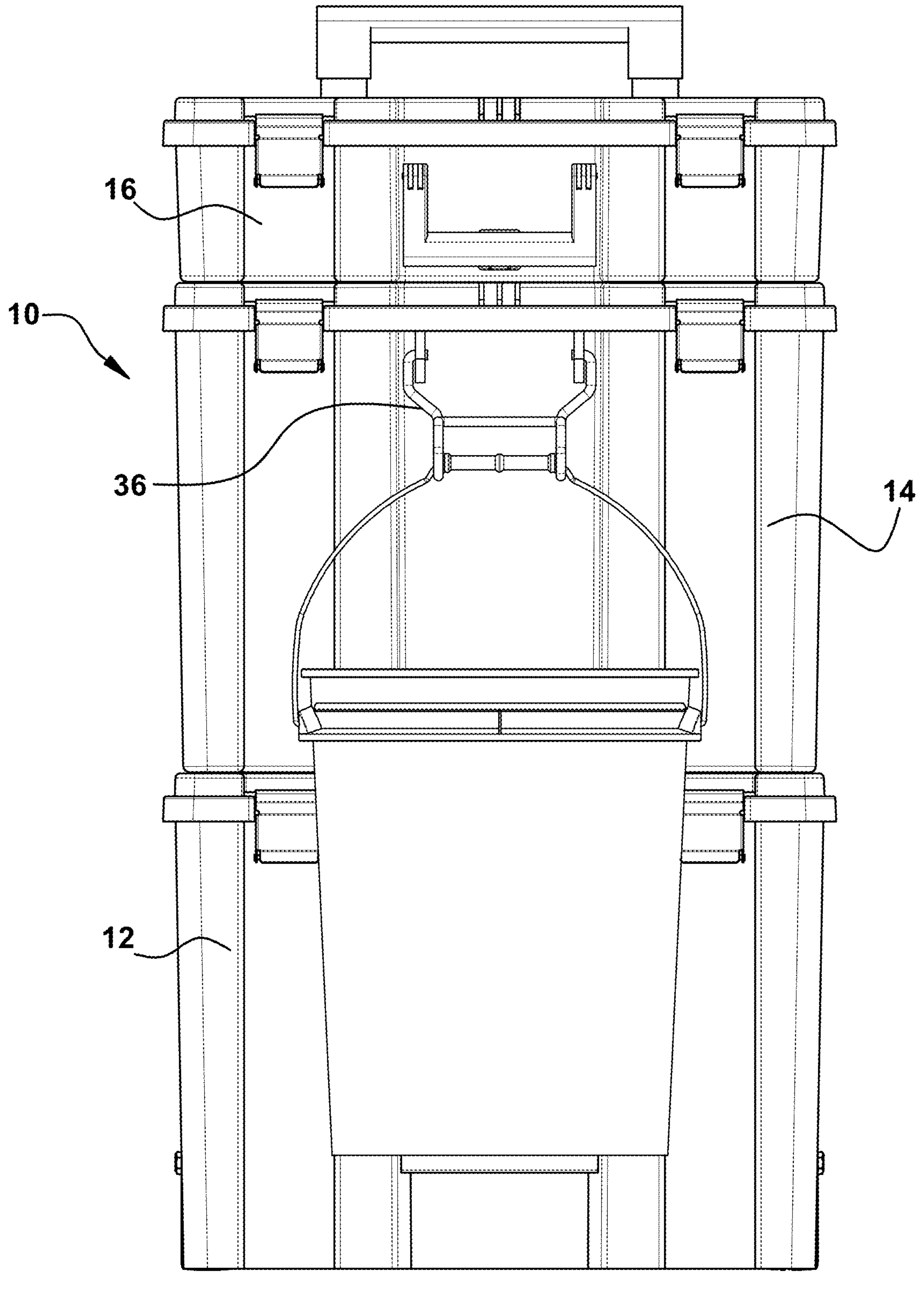
FIG. 2 is a front view of the modular toolbox illustrated in FIG. 1.
Figure 3:
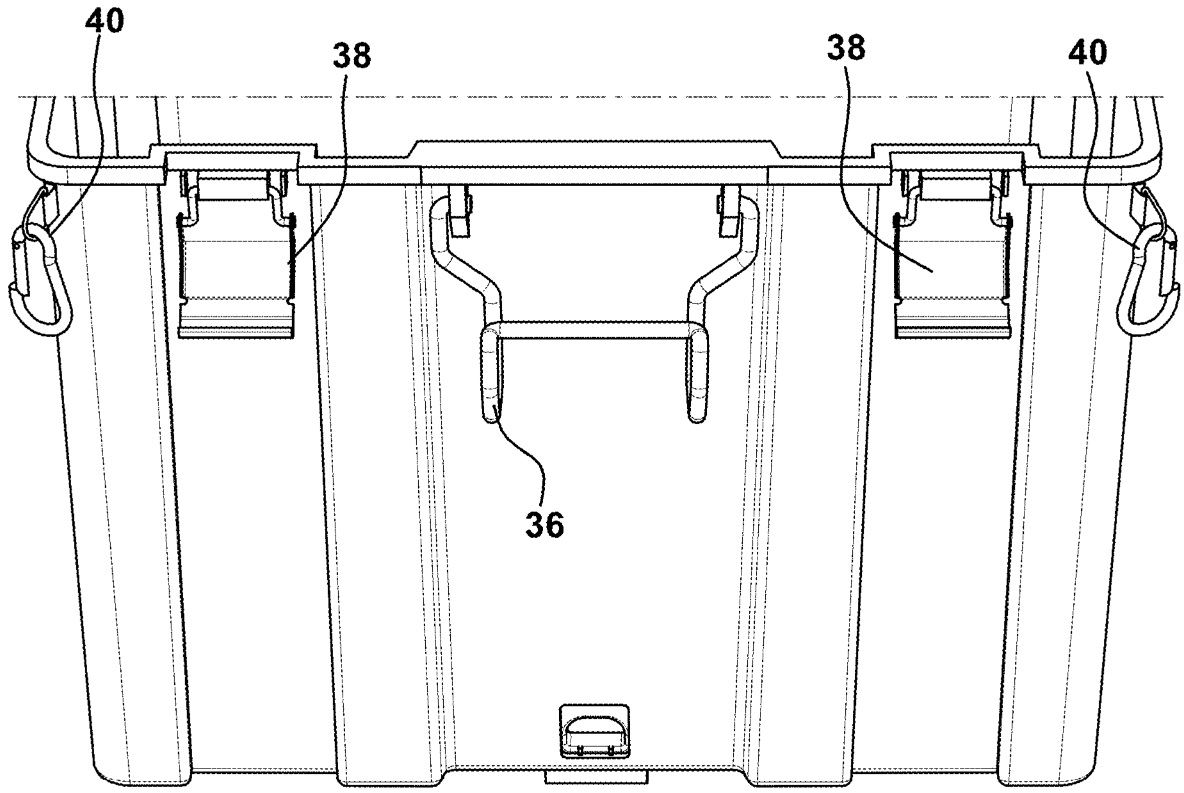
FIG. 3 is a front view of a middle toolbox module of the toolbox illustrated in FIG. 1.

The middle toolbox module 14 comprises middle lid 34 and external bucket hook 36. External bucket hook 36 is attached to the middle toolbox module 14 and can carry paint buckets such as a one-gallon bucket, a five-gallon bucket, or any suitably sized bucket of paint as shown in FIGS. 2 and 6. Middle lid 34 can be secured by middle latches 38. Items may be attached to the exterior of middle toolbox module 14 by using rings 40, for example by using a carabiner connector inserted into hook. Rings 40 can also be used as anchor points to secure middle toolbox module 14 during transport. As will be explained in more detail herein infra, middle toolbox module 14 can be employed for transport and storage of brushes, paint buckets, or other equipment. Middle toolbox module 14 can have integrated side handles 15 for lifting.

Top toolbox module 16 comprises a top lid 44, top latches 46, top front folding handle 48, and top lid folding handle 50. Top lid folding handle 50 is attached to top lid 44, and top lid 44 is secured by top latches 46. Top toolbox module 16 can be divided by partitions 52 and can contain a plurality of bins 54. Top toolbox module 16 can also comprise a white board 57 or other writing apparatus such as a clipboard or notebook. White board 57 or other writing apparatus can be attached to top lid 44. Lights 58 can be removably mounted to the inside of top lid 44 with a magnet or other means, such as Velcro (hook and loop). Lights such as these can be advantageous for job sites with low light or no power. Top toolbox module 16 can be used for the storage of smaller items such as sandpaper, sanding blocks, documents, gloves, and the like. Top rings 56 can be used to anchor the toolbox module 16 to a vehicle, such as the bed of a truck or inside of a van, or to attach items to the outside of top toolbox module 16.

Figure 6A:
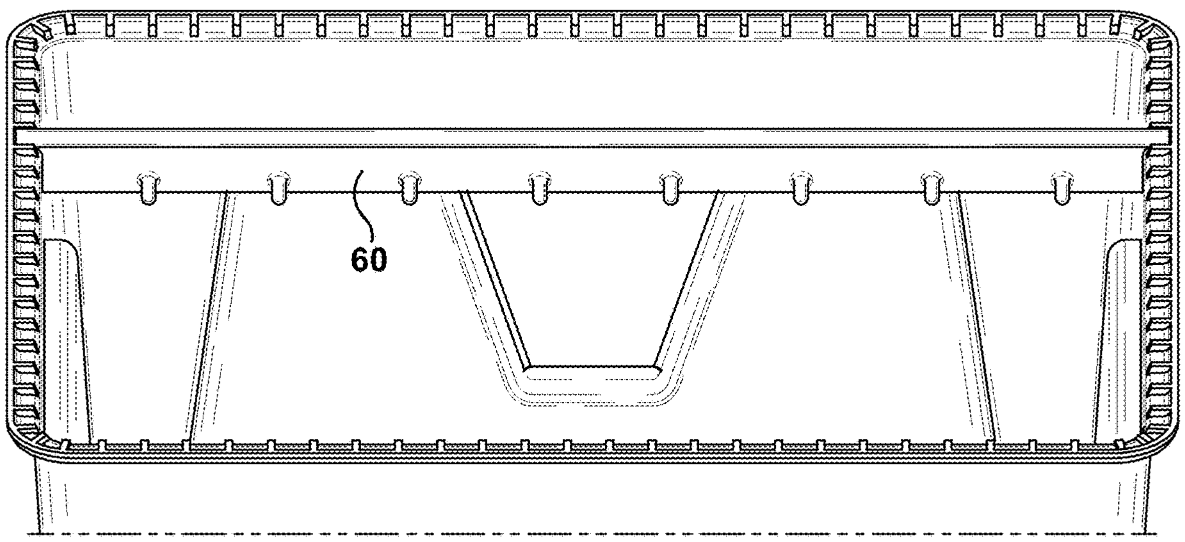
FIG. 6A is a front perspective view of a toolbox module illustrated in FIG. 1 with a first embodiment of a brush hanging bar.
Figure 6B:
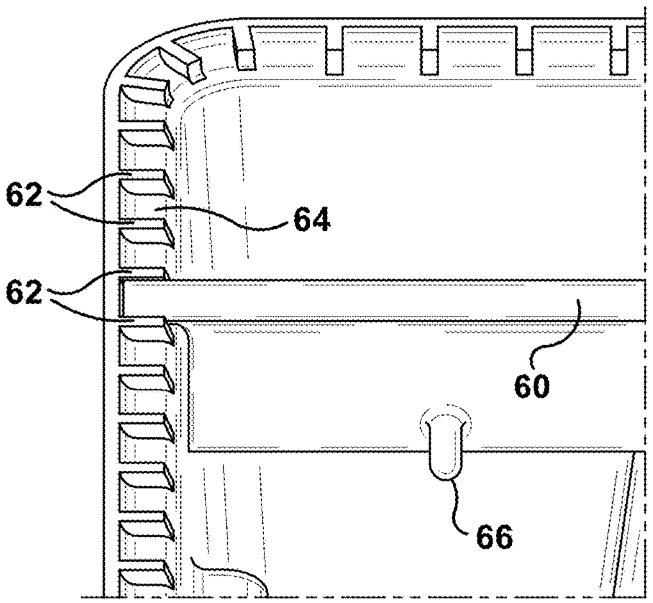
FIG. 6B is a detailed front perspective view of a toolbox module with the first embodiment of the brush hanging bar illustrated in FIG. 6A.
Figure 6C:
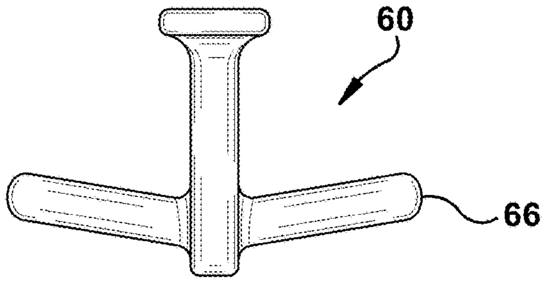
FIG. 6C is a side end view of the first embodiment of the brush hanging bar illustrated in FIG. 6A.

FIGS. 6A-6C illustrate various views of a first brush hanging bar 60 in accordance with an example embodiment. Brush hanging bar 60 can be implemented in either or both of bottom toolbox module 12 or middle toolbox module 14 to hang paint brushes or other painting equipment such as putty knives or scrapers. In at least one embodiment, the brushes can be hung while still wet with paint, so they can be transported to an area away from the job site to be cleaned later. For example, the middle toolbox module could be used to hang the clean brushes, and the bottom toolbox module could be used to hang the wet brushes, or vice-versa.

FIGS. 6A and 6B show a series of support ribs 62 that can be molded into a ledge 64 on the interior area of either bottom toolbox module 12 or middle toolbox module 14. Brush hanging bar 60 can be placed into a toolbox module such that it spans the interior volume of either bottom toolbox module 12 or middle toolbox module 14, as shown in FIG. 6A, and rests on ledge 64 in between two of the support ribs 62. The support ribs will prevent the brush hanging bar 60 from moving along the ledge 64 and will thus help provide a stable platform for hanging brushes on bar 60.

Brush hanging bar 60 can further comprise hooks 66. A paint brush (not pictured) can have a hole in the handle, and the hole can slide over the hook 66 such that it will hang the paint brush in place. As seen in FIG. 6A, there are eight hooks 66 spaced equally along the brush hanging bar 60. The spacing can be determined for hanging of an appropriately sized brush. In other embodiments, the spacing does not need to be equal, in order to accommodate different sized paint brushes on the same brush hanging bar. A different embodiment of brush hanging bar 60 can be dimensioned length-wise to span the toolbox module in a perpendicular direction, e.g., in the direction that is perpendicular to the embodiment shown in FIG. 6A.

Figure 7A:
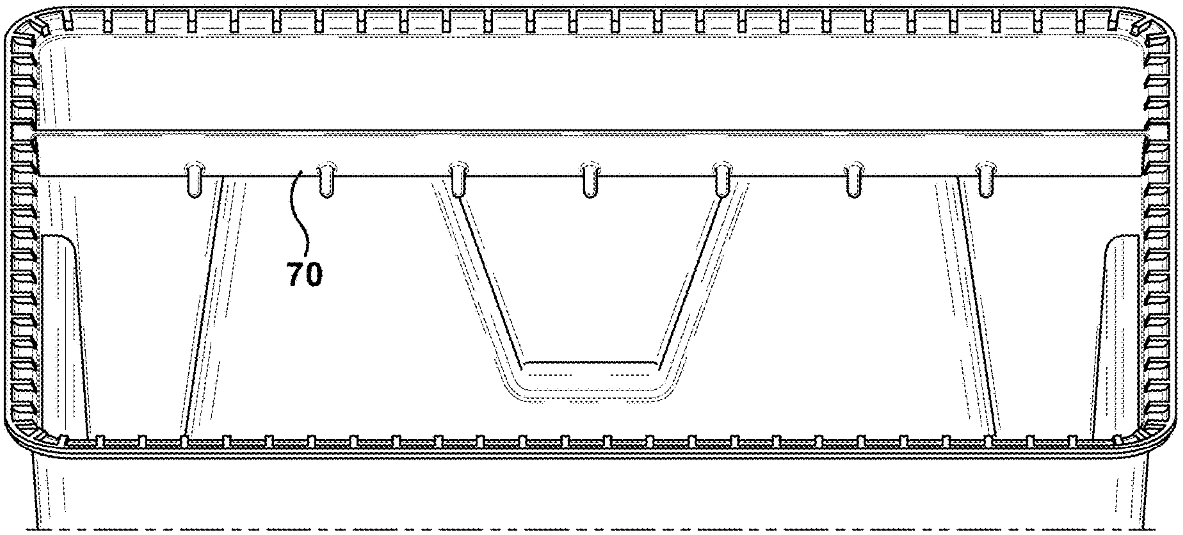
FIG. 7A is a front perspective view of a toolbox module illustrated in FIG. 1 with a second embodiment of the brush hanging bar.
Figure 7B:
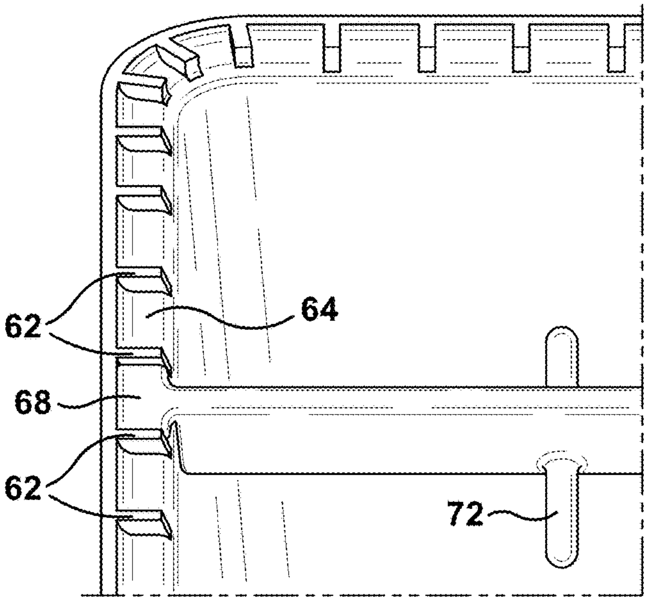
FIG. 7B is a detailed front perspective view of a toolbox module with the second embodiment of the brush hanging bar illustrated in FIG. 7A.
Figure 7C:
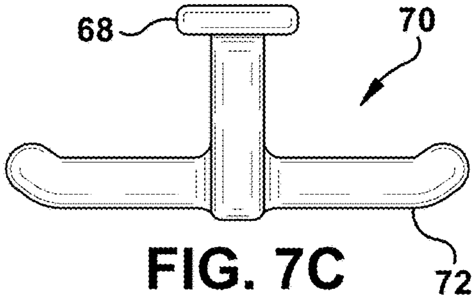
FIG. 7C is a side end view of the second embodiment of the brush hanging bar illustrated in FIG. 7A.

FIG. 7C, illustrates an example of the shape of the brush hanging bar 60. Also, FIG. 7B shows that the portion of the brush hanging bar 60 that rests in between support ribs 62 stays a uniform width over the total span of brush hanging bar 60. FIG. 7C also shows that hooks 66 have a slight upward angle so that the hanging brushes are less likely to slip or fall from hook 66.

FIGS. 7A-7C illustrate views of a second brush hanging bar 70 in accordance with another example embodiment. Brush hanging bar 70 can be implemented in either bottom toolbox module 12 or middle toolbox module 14 to hang brushes and can be likewise used to hang either wet or dry brushes. Brush hanging bar 70 can be placed into a toolbox module such that it spans the interior volume of either bottom toolbox module 12 or middle toolbox module 14, as shown in FIG. 7A, and rests on ledge 64 in between two of the support ribs 62.

Brush hanging bar 70 can further comprise hooks 72 for hanging paint brushes as described above. As seen in FIG. 7A, there are seven hooks 72 spaced equally along the brush hanging bar 70. The spacing can be determined for hanging of an appropriately sized brush. In another embodiment, the spacing does not need to be equal, in order to accommodate different sized paint brushes on the same brush hanging bar. A different embodiment of brush hanging bar 70 can also be dimensioned length-wise to span the toolbox module in a perpendicular direction, e.g., in the direction that is perpendicular to the embodiment shown in FIG. 7A.

FIG. 7C illustrates an example of the brush hanging bar 70 shape. FIG. 7B shows that a mini-tab 68 of the brush hanging bar 70 rests in between support ribs 62. FIGS. 7B and 7C show that the mini-tab 68 is wider than the span of brush hanging bar 70. Hooks 72 are generally perpendicular to the brush hanging bar 70 but have a slight upward inclination at the end opposite the brush hanging bar 70 so that the hanging brushes are less likely to slip or fall from hook 72.

Figure 8A:
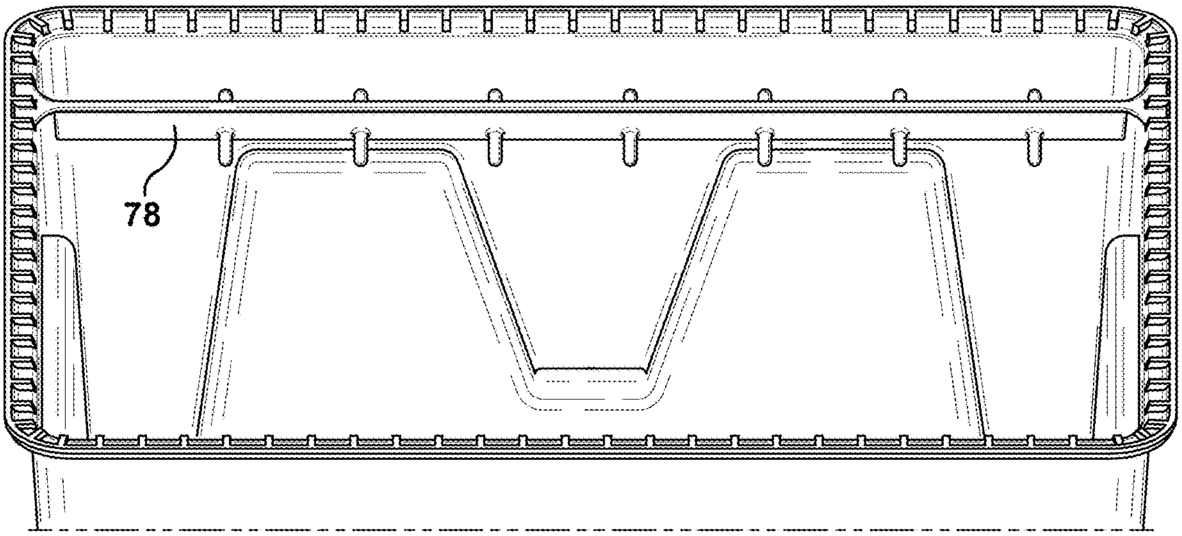
FIG. 8A is a front perspective view of a toolbox module illustrated in FIG. 1 with a third embodiment of the brush hanging bar.
Figure 8B:
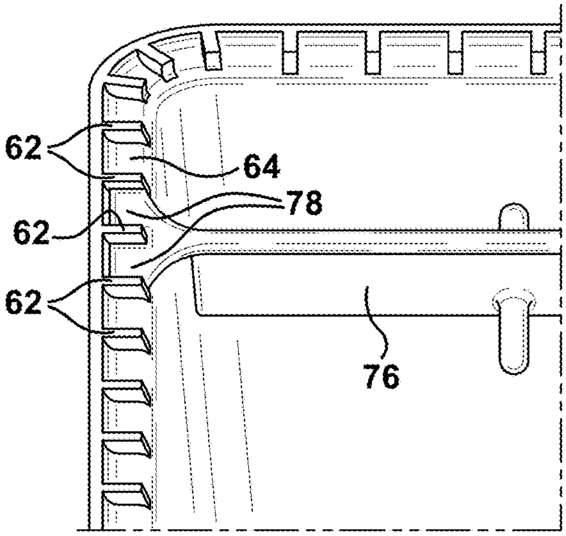
FIG. 8B is a detailed front perspective view of a toolbox module with the third embodiment of the brush hanging bar illustrated in FIG. 8A.
Figure 8C:
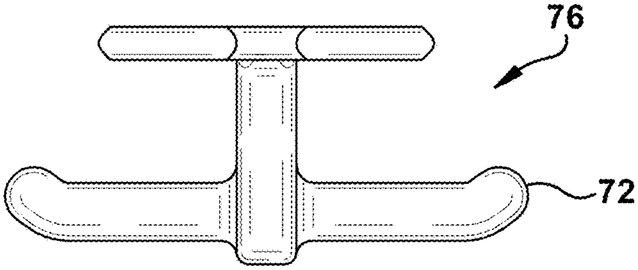
FIG. 8C is a side end view of the third embodiment of the brush hanging bar illustrated in FIG. 8A.

FIGS. 8A-8C illustrate views of a third example of a brush hanging bar 76 in accordance with another example embodiment. Brush hanging bar 76 can be implemented in either bottom toolbox module 12 or middle toolbox module 14 to hang brushes and can be likewise used to hang either wet or dry brushes. Brush hanging bar 76 can be placed into a toolbox module such that it spans the interior volume of either bottom toolbox module 12 or middle toolbox module 14, as shown in FIG. 8A, and rests on ledge 64. However, brush hanging bar 76 has dual-tab configuration 78 such that it can occupy two spaces in between two of the support ribs 62, as seen in FIG. 8B. FIGS. 8B and 8C show that the dual-tab 78 is wider than the span of brush hanging bar 76. Hooks 72 are the same type as described for brush hanging bar 70. A different embodiment of brush hanging bar 76 can also be dimensioned length-wise to span the toolbox module in a perpendicular direction, e.g., in the direction that is perpendicular to the embodiment shown in FIG. 8A.

Figure 9:
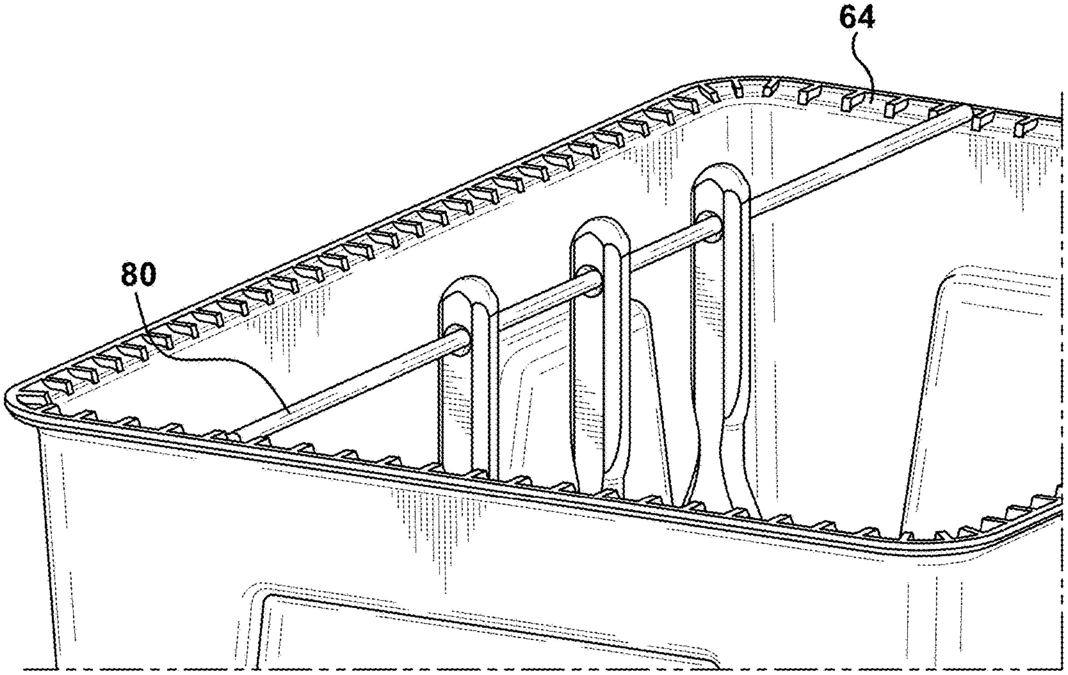
FIG. 9 is a side perspective view of a toolbox module illustrated in FIG. 1 with a fourth embodiment of a brush hanging bar.
Figure 10:
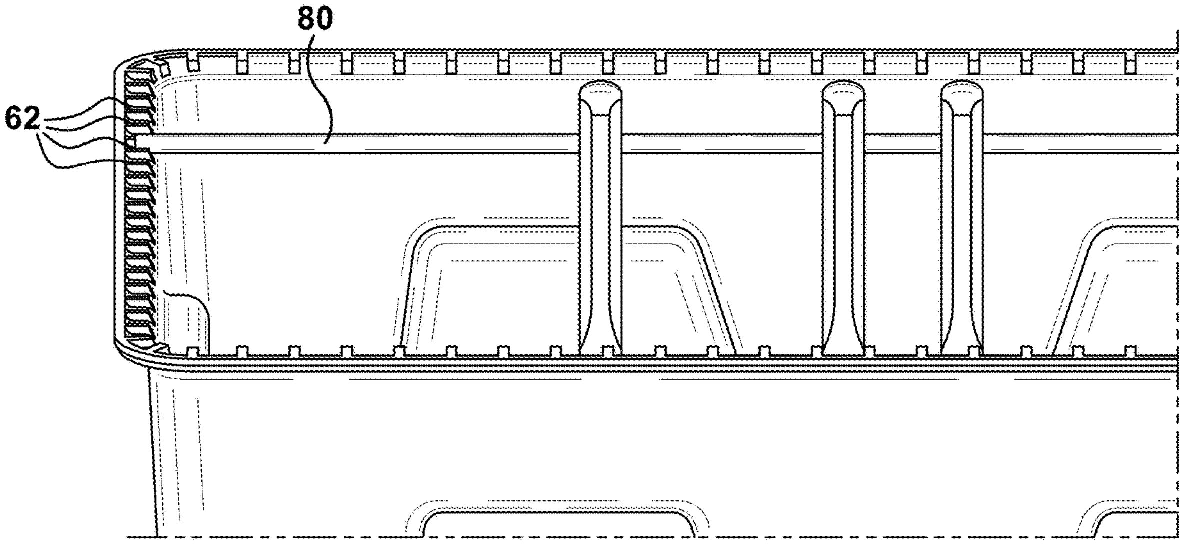
FIG. 10 is a front perspective view of a toolbox module illustrated in FIG. 1 with the fourth embodiment of a brush hanging bar.

FIGS. 9 and 10 illustrate views of a fourth brush hanging bar 80 in accordance with another example embodiment. Brush hanging bar 80 can be implemented in either bottom toolbox module 12 or middle toolbox module 14 to hang brushes and can be likewise used to hang either wet or dry brushes. Brush hanging bar 80 can be placed into a toolbox module such that it spans the interior volume of either bottom toolbox module 12 or middle toolbox module 14, as shown in FIG. 9, and rests on ledge 64 in between two of the support ribs 62. Brush hanging bar 80 can be a metal or wooden dowel rod. While providing a maximum amount of security against brushes falling off the brush hanging bar 80 and allowing for a very high density of hanging brushes, this type of hanger can prevent easy removal of a brush from the rack. Brush hanging bar 80 can be dimensioned length-wise to span the toolbox module in a perpendicular direction, e.g. in the direction that is perpendicular to the embodiment shown in FIG. 9.

Figure 4:
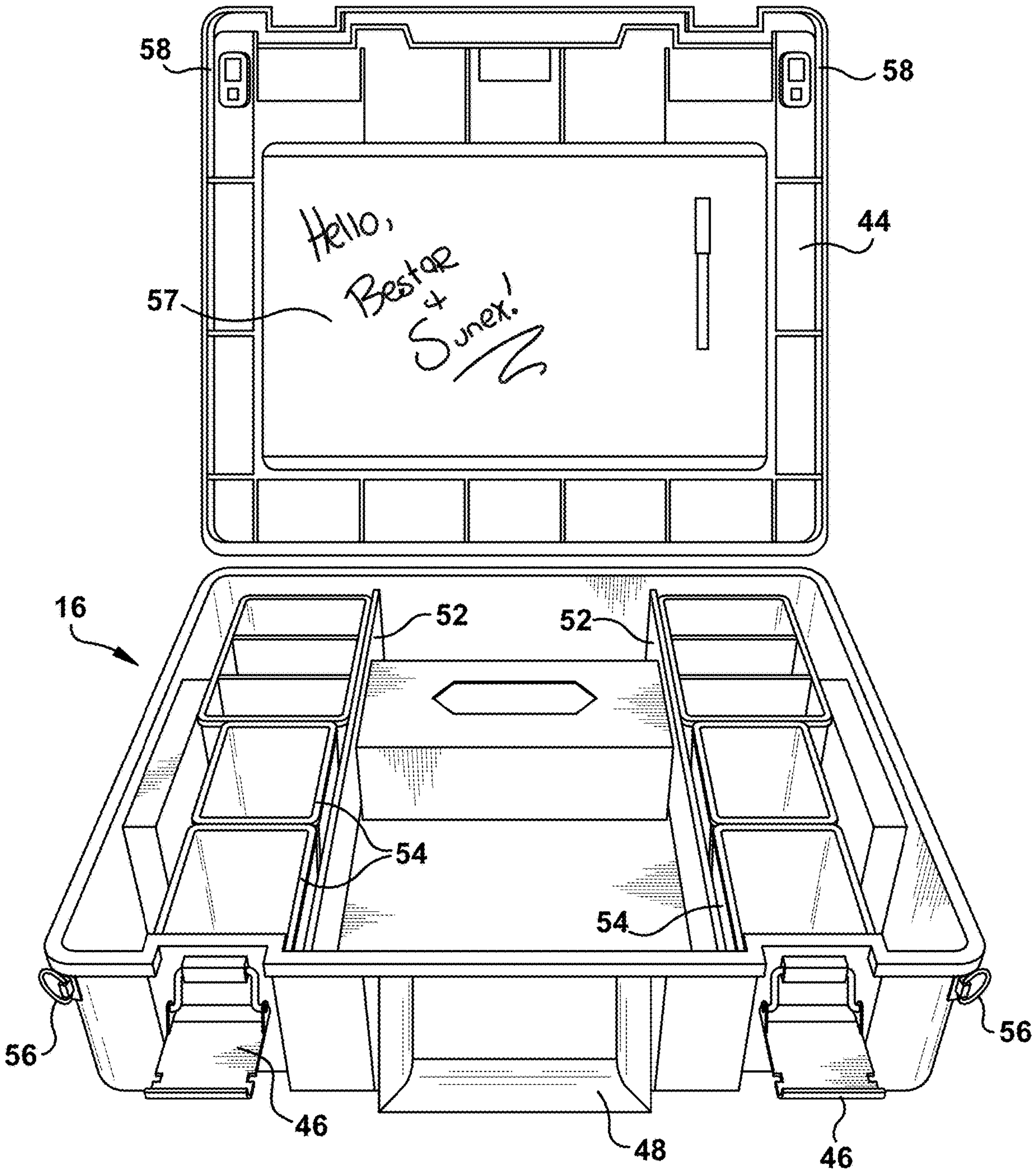
FIG. 4 is a front view of a top toolbox module of the toolbox illustrated in FIG. 1.
Figure 5:
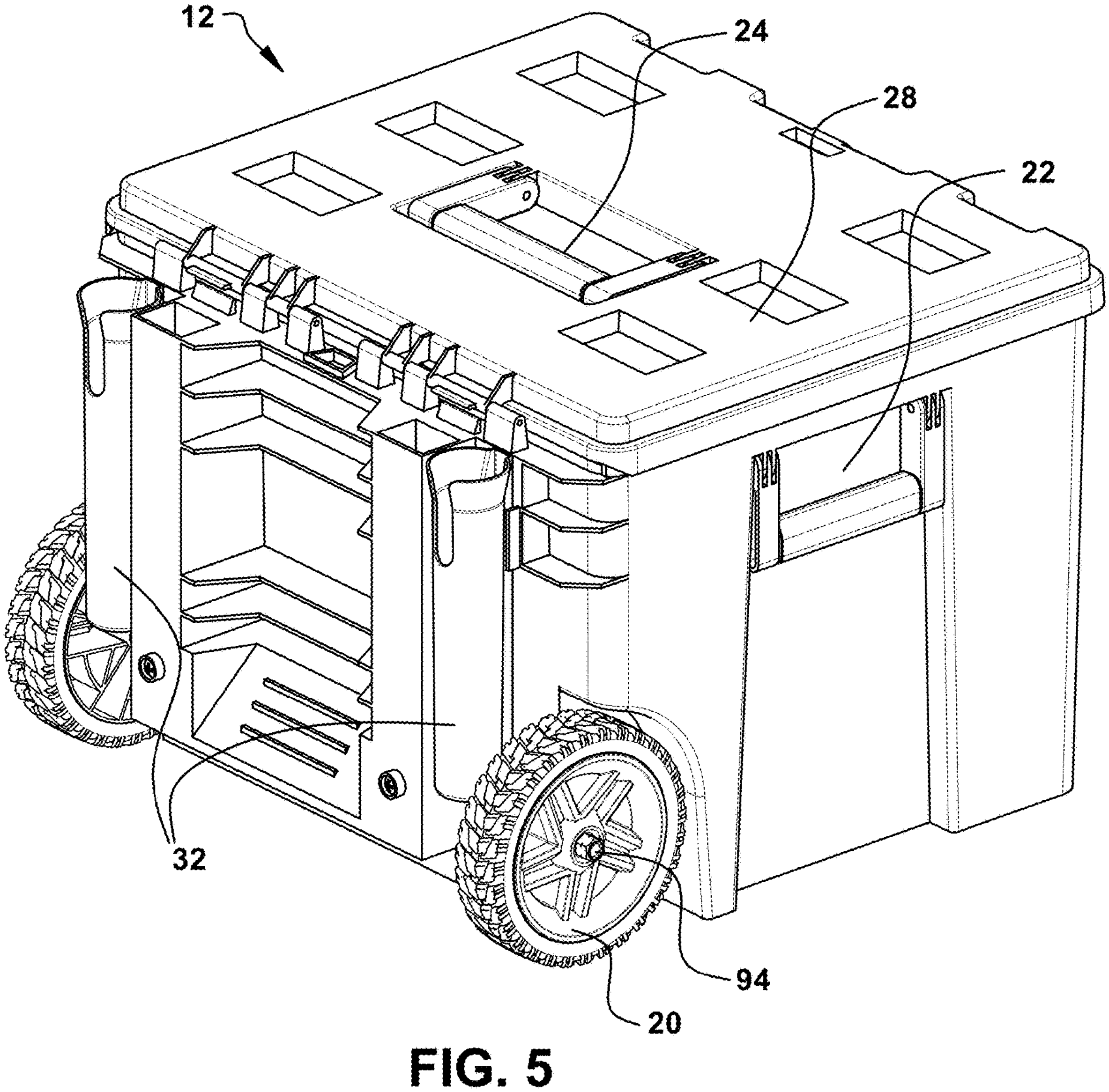
FIG. 5 is a rear perspective view of the bottom toolbox module of the toolbox illustrated in FIG. 1.
Figure 11A:
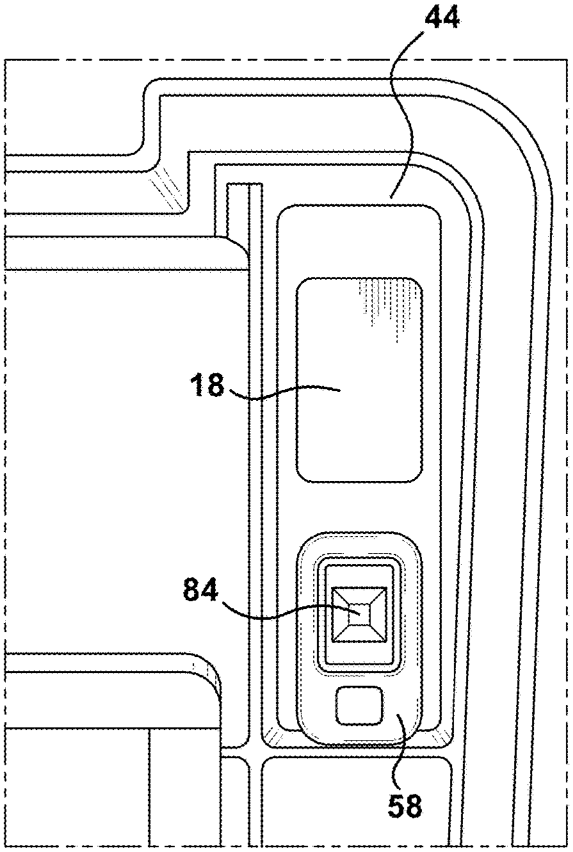
FIG. 11A is a front detailed view of the top toolbox module illustrated in FIG. 4 with a metallic plate, and a front view of a removable light.
Figure 11B:
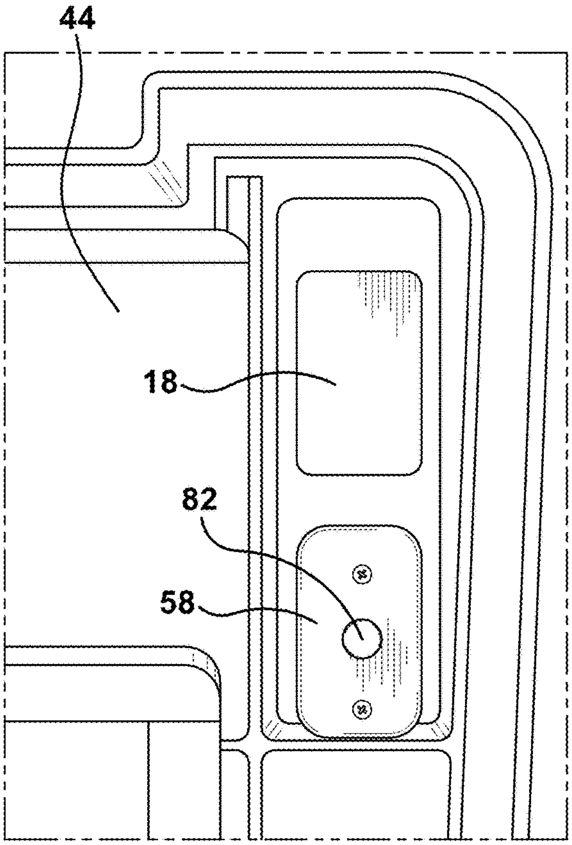
FIG. 11B is a front detailed view of the top toolbox module illustrated in FIG. 4 with the metallic plate, and a rear view of the removable light.

FIGS. 11A and 11 B show a close-up of light 58 that can be removably mounted inside top lid 44 (see FIG. 4 for example). FIG. 11A shows the front side of light 58 and FIG. 11 B shows the rear side of light 58. Light 58 has light emitting element 84, which can consist of, for example, an LED or a plurality of LEDs. Metal plate 18 can be imbedded or molded into top lid 44 and can provide an attractive surface for magnet 82 on the rear of light 58 to hold light 58 in place.

Figure 12:
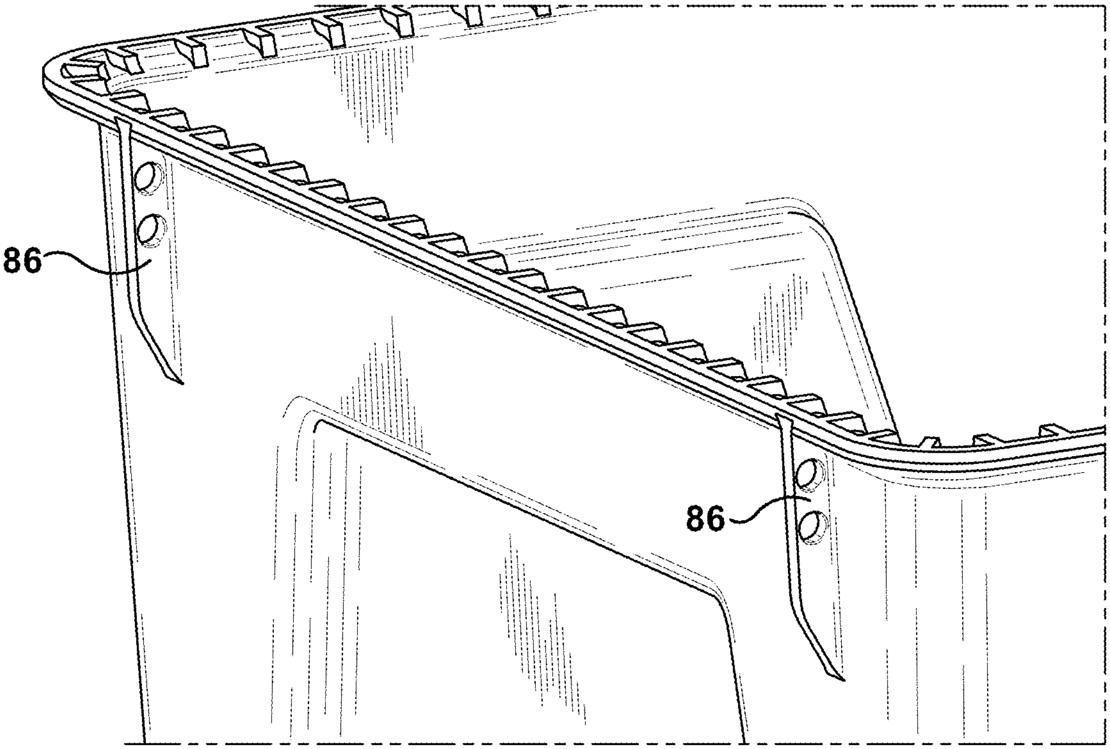
FIG. 12 is a detailed side perspective view of a toolbox module illustrated in FIG. 1 showing external anchor points.
Figure 13:
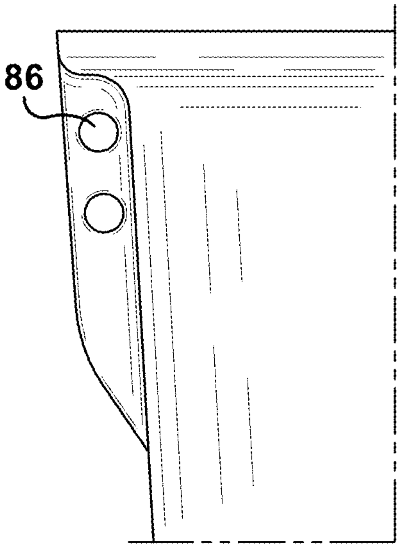
FIG. 13 is a detailed front view of a toolbox module illustrated in FIG. 1 showing external anchor points.
Figure 14:
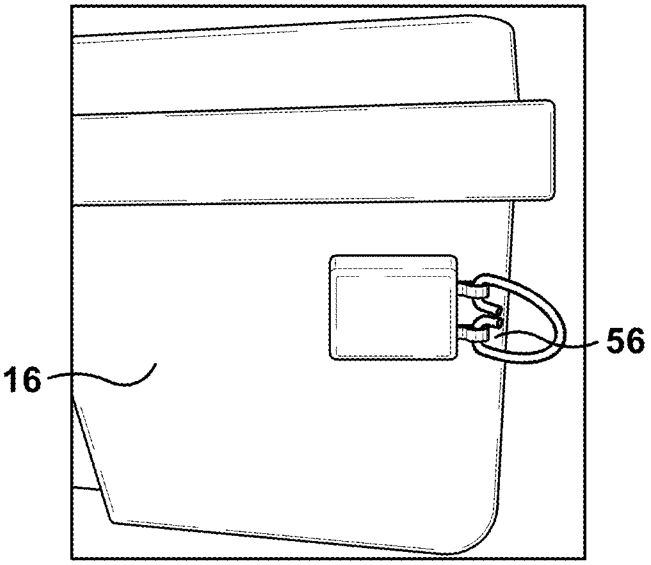
FIG. 14 is a detailed front view of the top toolbox module illustrated in FIG. 4 showing an embodiment of an anchor point.

FIGS. 12-14 illustrate embodiments of external anchor points that can be implemented on either the bottom toolbox module 12, the middle toolbox module 14, or the top toolbox module 16. FIGS. 12 and 13 show examples of anchor points 86 that are molded directly into the toolbox module. For example, one end of a bungee cord or other connecting device can be attached to the anchor point and the other end of the cord can be attached to a truck or van during transport. Thus, the anchor points can provide additional storage and load security. The anchor points can be formed into any ideal shape for mechanical integrity, for example a ribbed geometry.

FIG. 14 shows a D-Ring as an example of a type of anchor point 56 implemented on the top toolbox module 16. This type is a metallic ring that is attached to a metal anchor embedded into top toolbox module 16 and can be used to anchor the top toolbox module 16 to a vehicle, such as the bed of a truck or inside of a van, or to attach items to the outside of top toolbox module 16.

Figure 15:
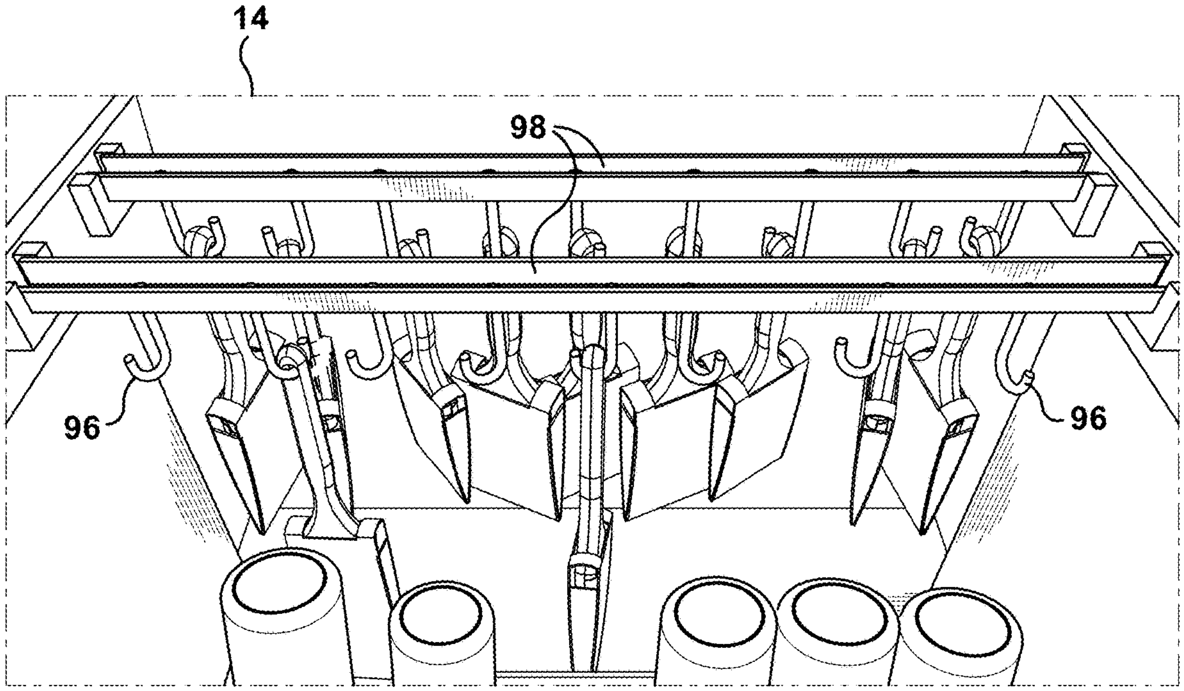
FIG. 15 illustrates an example configuration of the middle toolbox module with paint supplies stored therein.

FIG. 15 illustrates an example configuration of the middle toolbox module 14 with paint supplies stored therein. In the illustrated example, paint brushes are hanging from hooks 96 mounted on brush hanging bars 98. Other paint supplies, such as rollers, are stored at the bottom of the module. As those skilled in the art can readily appreciate, the number of hooks 96 and brush hanging bars in the illustrated example were selected for ease of illustration and that any physically realizable number of hooks 96 and brush hanging bars 98 can be employed.

Figure 16:
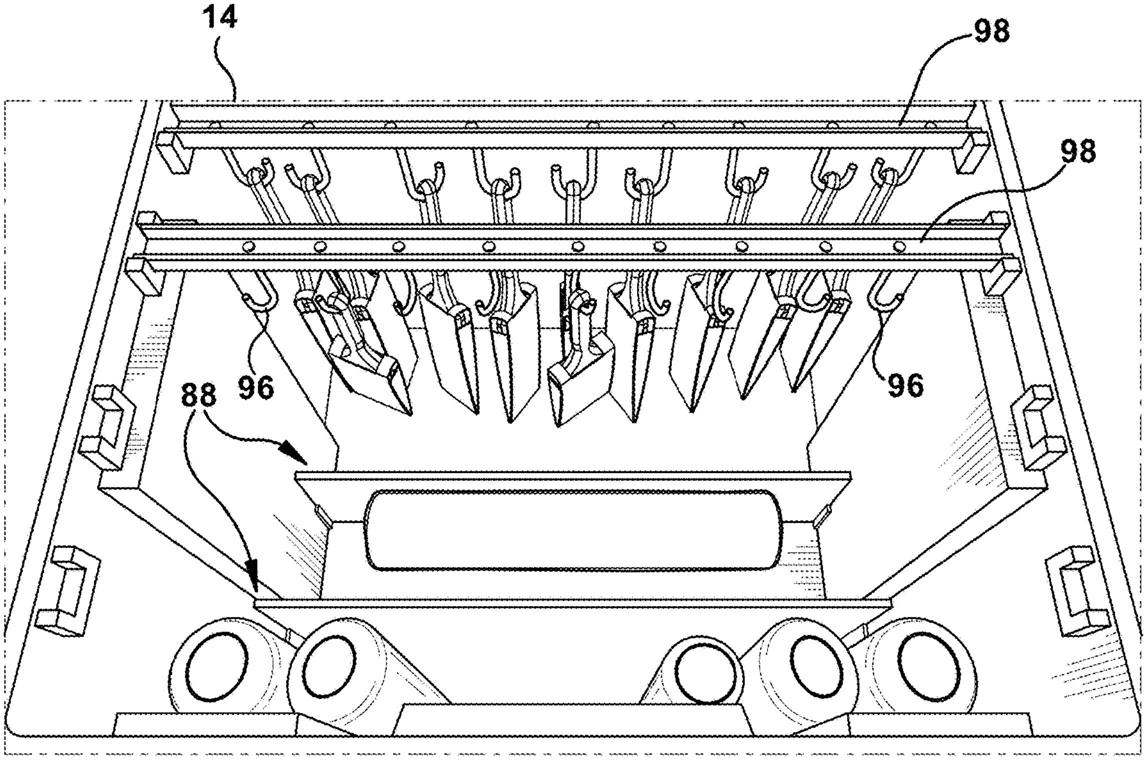
FIG. 16 illustrates an example of a second configuration of the middle toolbox module with paint supplies stored therein.

FIG. 16 illustrates an example of a second configuration of the middle toolbox module 14 different paint supplies stored therein. In this example, partitions or dividers 88 are employed to provide separate compartments for storing supplies. In particular embodiments, lids (not shown) are fitted to be removably attached to the dividers 88 for enclosing the compartment. This can allow for the transport of wet items within the compartments formed by dividers 88 without contaminating other items stored within middle toolbox module 14. As those skilled in the art can readily appreciate, the number of hooks 96 and brush hanging bars in the illustrated example were selected for ease of illustration and that any physically realizable number of hooks 96 and brush hanging bars 98 can be employed.

Figure 17:
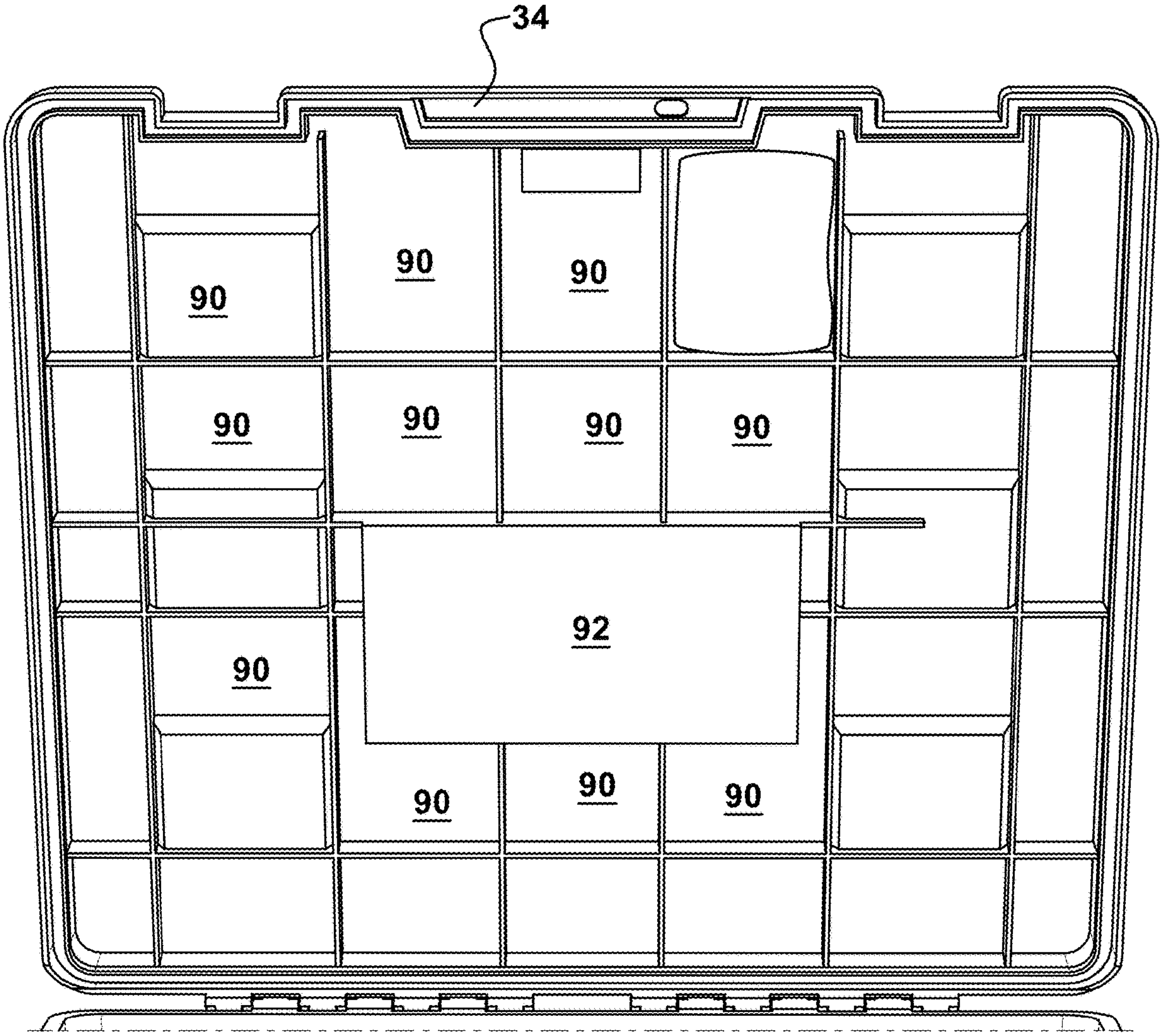
FIG. 17 illustrates an example configuration of the lid of the middle toolbox module.

FIG. 17 illustrates an example configuration of the lid 34 of the middle toolbox module. In the illustrated example, the lid ribs are configured to double as a storage compartment or bin 90. In particular embodiments, a cover 92 is provided for at least one of the plurality of bins 90. In other example embodiments, one or both of top lid 44 and bottom lid 28 may be similarly configured. In an example embodiment.

Figure 18:
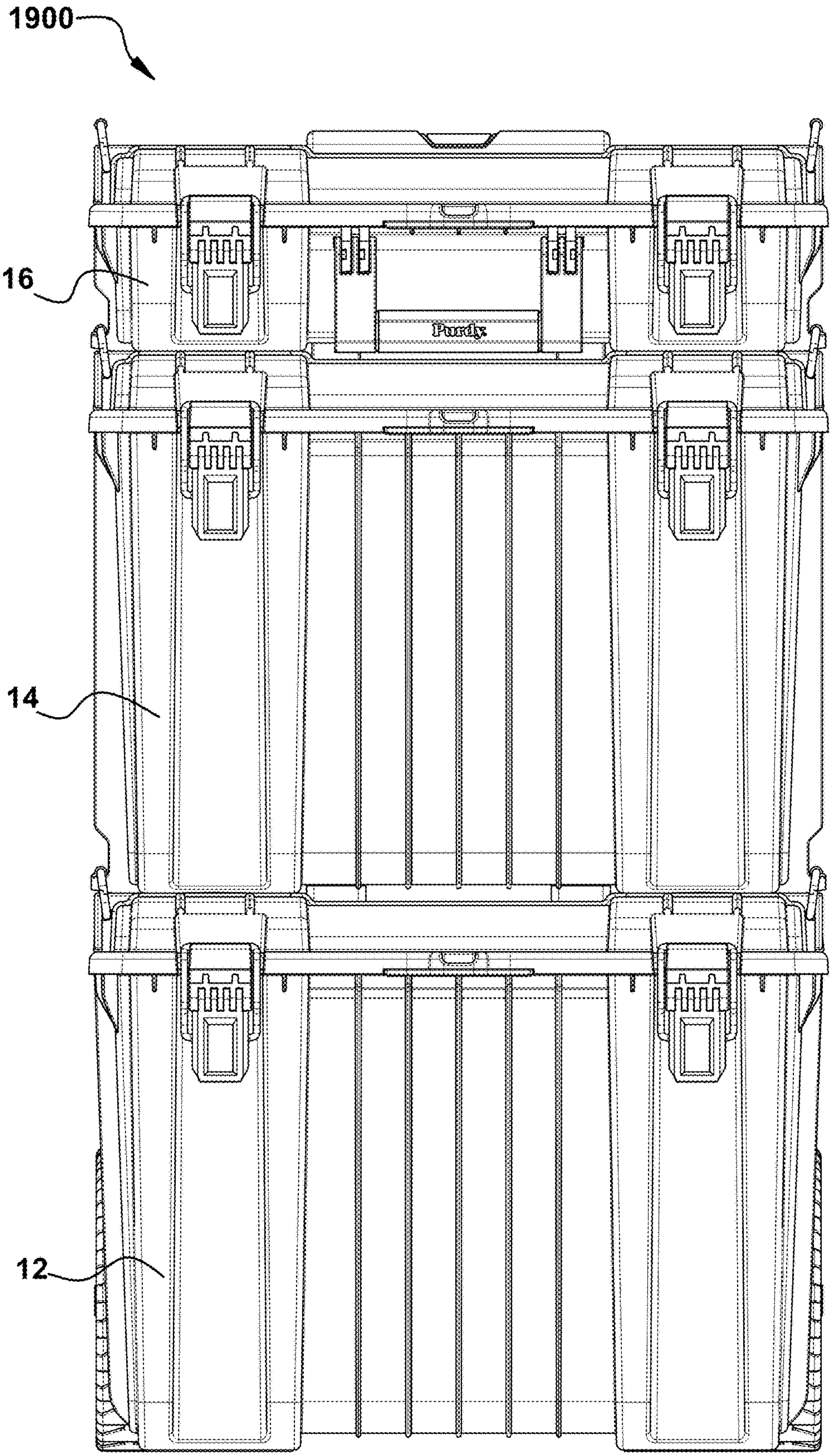
FIG. 18 illustrates a front view of a second embodiment of a modular toolbox designed and organized for painting tools.

FIG. 18 illustrates a front view of a second embodiment 1900 of a modular toolbox designed and organized for painting tools. The second embodiment 1900 of the modular toolbox designed and organized for painting tools comprises a bottom toolbox module 12, middle toolbox module 14, and a top toolbox module 16. The bottom toolbox module 12, middle toolbox module 14, and the top toolbox module 16 can be configured with any one or combination of the features described herein.

Figure 19:
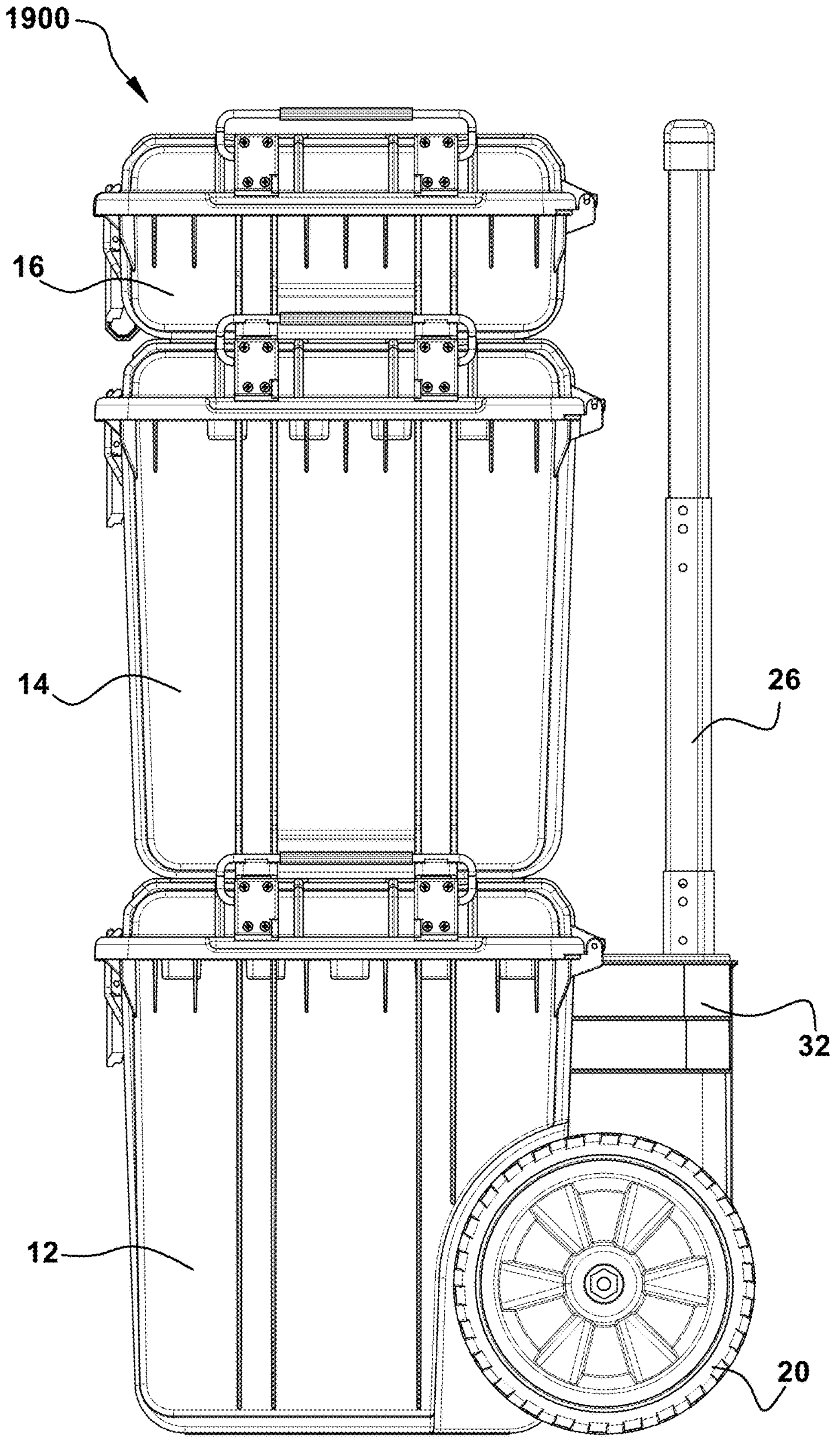
FIG. 19 illustrates a first side view of the second embodiment of a modular toolbox designed and organized for painting tools.
Figure 20:
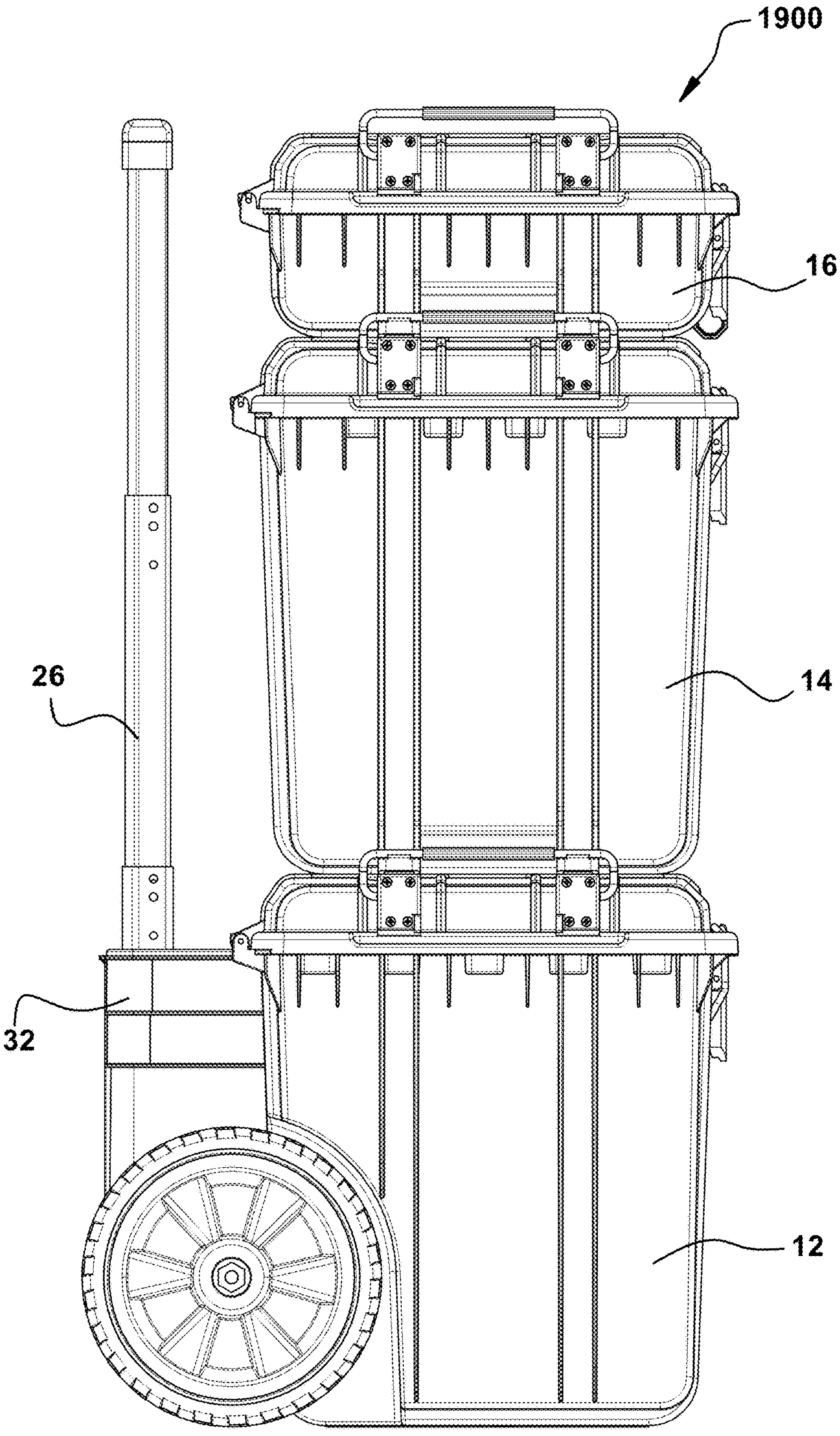
FIG. 20 illustrates a second side view of the second embodiment of a modular toolbox designed and organized for painting tools.
Figure 21:
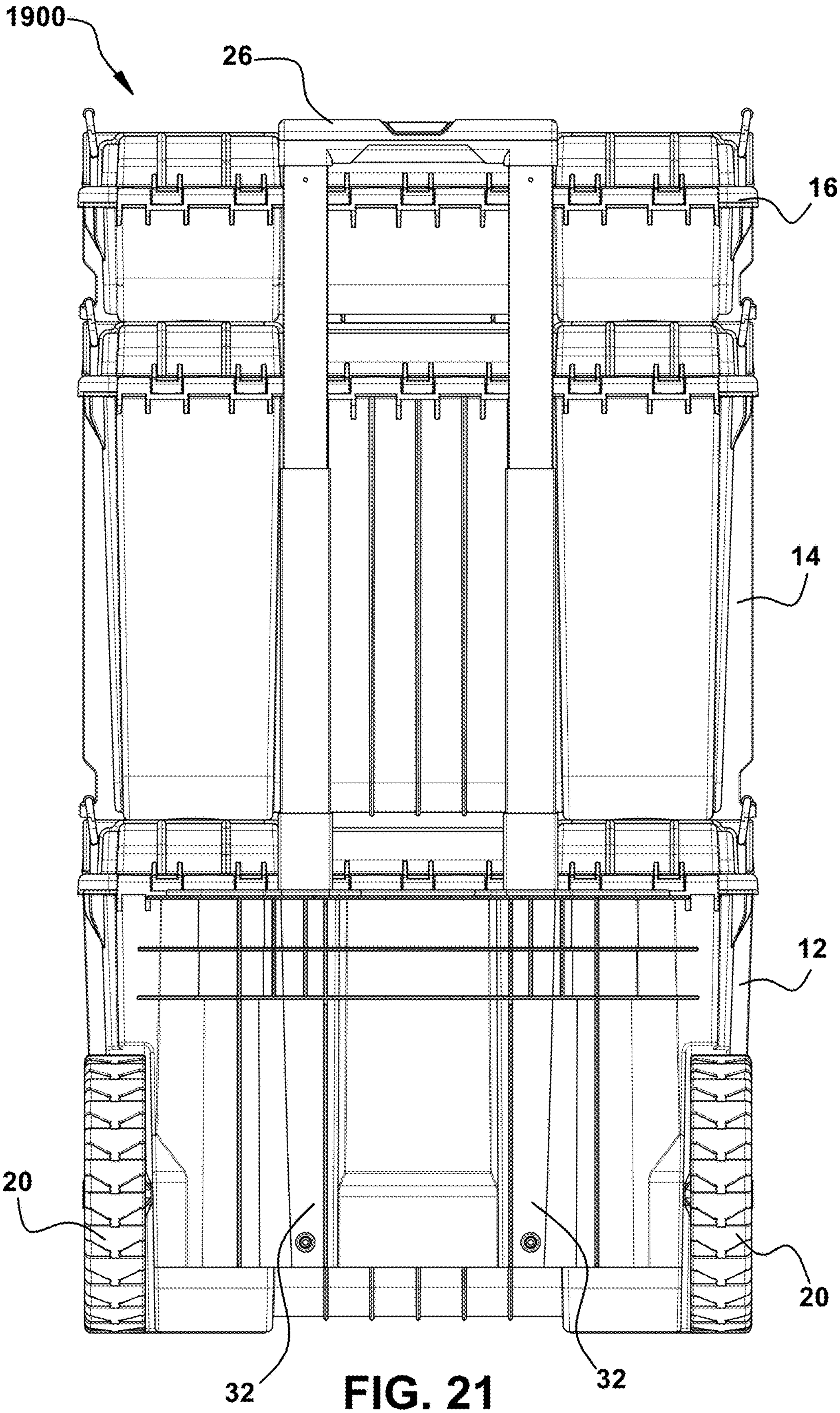
FIG. 21 illustrates a rear view of the second embodiment of a modular toolbox designed and organized for painting tools.

FIG. 19 illustrates a first side view of the second embodiment 1900 of a modular toolbox designed and organized for painting tools. FIG. 20 illustrates a second side view of the second embodiment 1900 of the modular toolbox designed and organized for painting tools. FIG. 21 illustrates a rear view of the second embodiment 1900 of the modular toolbox designed and organized for painting tools.

Figure 22:
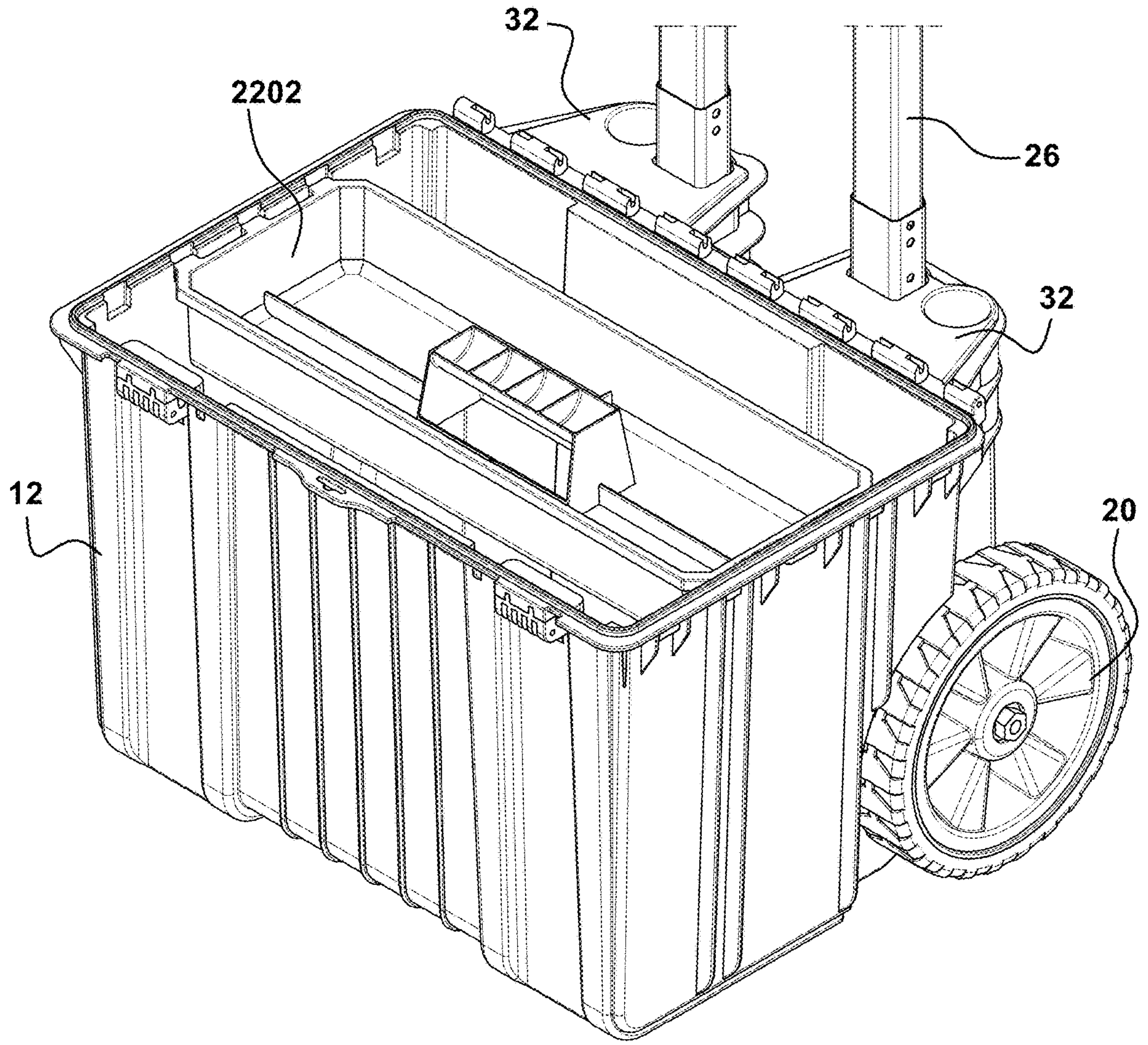
FIG. 22 illustrates an example of the bottom module of the second embodiment of a modular toolbox designed and organized for painting tool with a toolbox tray.

FIG. 22 illustrates an example of the bottom module 12 of the second embodiment 1900 of a modular toolbox designed and organized for painting tool with a toolbox tray 2201. In an example embodiment, the toolbox tray 2201 is configured with edges that fit into the ledges 64 between the support ribs 62 of the bottom toolbox module 12. In this example, the handle 26 is illustrated as partially cutaway.

Figure 23:
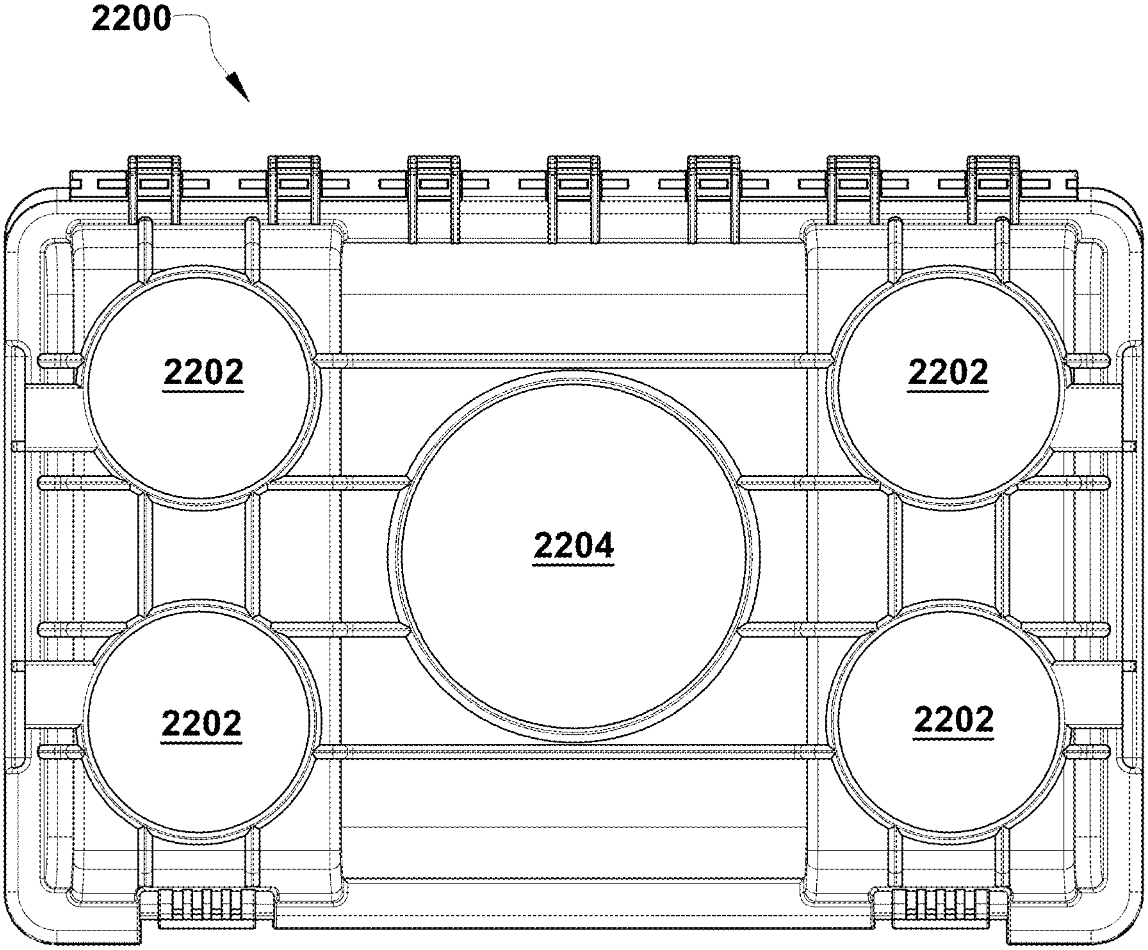
FIG. 23 illustrates an example of a top toolbox module lid with areas configured for holding cups and/or quart paint containers, and an area configured for holding a five gallon paint can.

FIG. 23 illustrates an example of a top toolbox module lid 2200 with areas 2202 configured for holding cups and/or quart paint containers, and an area 2204 configured for holding a five gallon paint can. In an example embodiment, areas 2202 and/or 2204 are molded onto a surface of the top toolbox lid 2200. In particular embodiments, one surface of the lid 2200 is configured as illustrated in FIG. 23 and another surface of the lid 2200 is configured as illustrated in FIG. 4.

Figure 24:
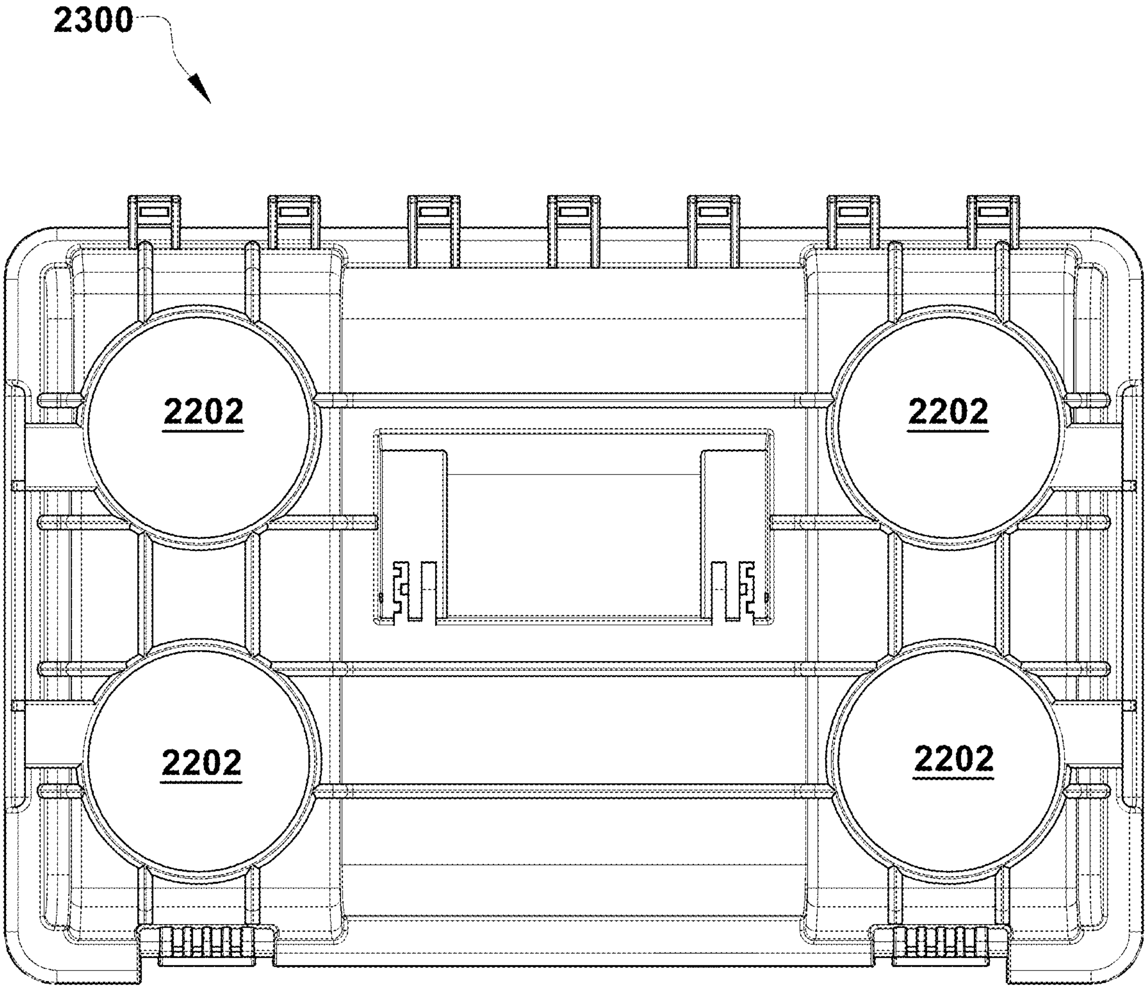
FIG. 24 illustrates an example of a lid suitable for the middle and/or bottom toolbox module lid with areas configured for holding cups and/or quart pain containers.
Figure 25:
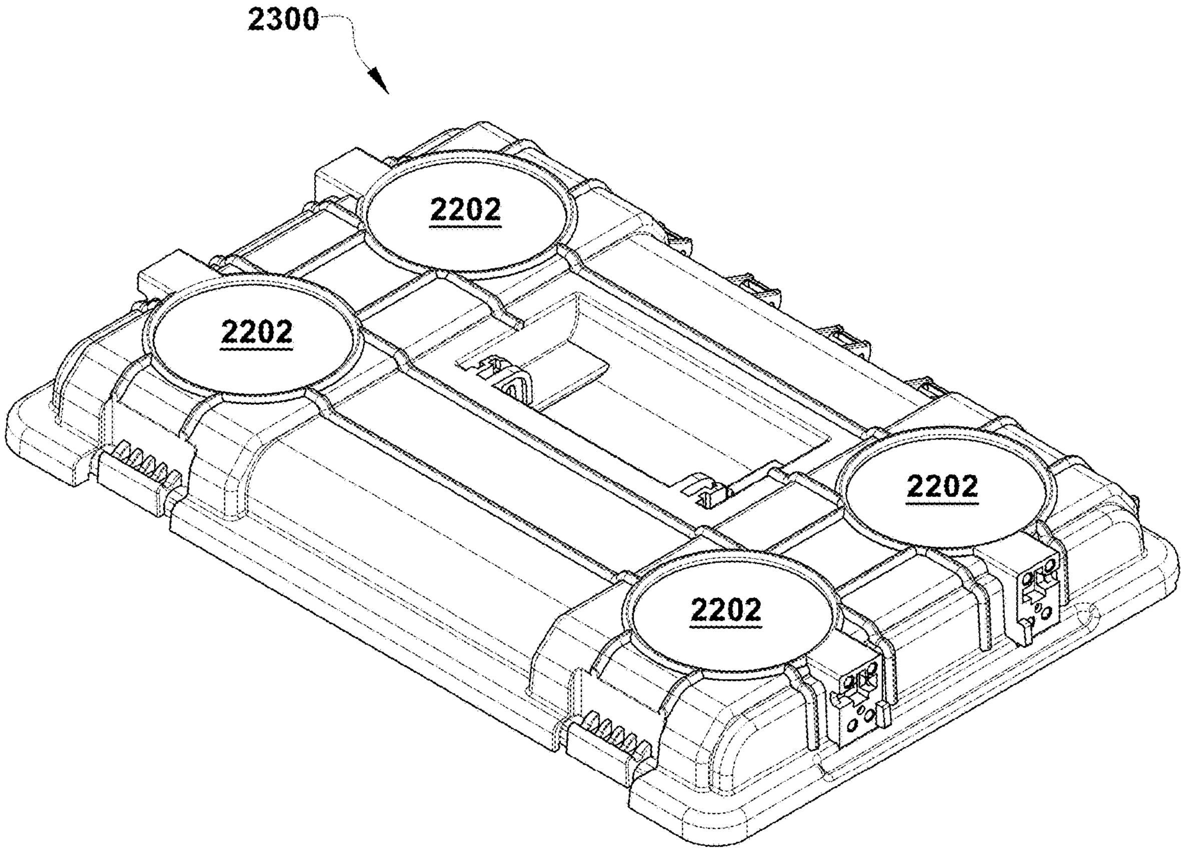
FIG. 25 is a perspective view that illustrates an example of a lid suitable for the middle and/or bottom toolbox module lid with areas configured for holding cups and/or quart pain containers.

FIG. 24 illustrates an example of a lid 2300 suitable for the middle and/or bottom toolbox module with areas 2202 configured for holding cups and/or quart pain containers. FIG. 25 is a perspective view that illustrates an example of a lid suitable for the middle and/or bottom toolbox module lid with areas configured for holding cups and/or quart pain containers.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. An apparatus, comprising:
- a bottom toolbox module;
- a middle toolbox module configured to mount on top of the bottom toolbox module;
- a top toolbox module configured to mount on top of the middle toolbox module
- the bottom toolbox module comprises a pair of wheels, an interior, a bottom toolbox module lid and a telescoping extension handle;
- the middle toolbox module comprises a middle toolbox module lid and an interior;
- the top toolbox module comprises a top toolbox module lid and an interior, the top toolbox module lid is configured to hold a predefined size paint can and comprises a plurality of cup holders;
- the interior of the middle toolbox module comprises a plurality of support ribs; and
- the interior of the middle toolbox module a brush hanging bar with hooks configured to mount between two of the plurality of support ribs.

2. The apparatus set forth in claim 1, the bottom toolbox module further comprising an extension pole holder.

3. The apparatus set forth in claim 1, the bottom toolbox module further comprising a plurality of extension pole holders adjacent to the telescoping handle.

4. The apparatus set forth in claim 1, the middle toolbox further comprising an external bucket hook.

5. The apparatus set forth in claim 1, the top toolbox module comprises a plurality of bins, at least one of the plurality of bins further comprises a removably attachable cover that is sized to cover the selected one of the plurality of bins.

6. The apparatus set forth in claim 1, the middle toolbox module lid comprises a plurality of cup holders.

7. The apparatus set forth in claim 6, the bottom toolbox module lid comprises a plurality of cup holders.

8. The apparatus set forth in claim 1, further comprising:
- the interior of the bottom toolbox module further comprises a plurality of support ribs; and
- a second brush hanging bar supported by the plurality of support ribs in the interior of the bottom toolbox module.

9. The apparatus set forth in claim 8, wherein the second brush hanging bar is a dowel shape.

10. The apparatus set forth in claim 9, wherein the hooks on the brush hanging bar in the interior of the middle toolbox module are spaced at various distances to hold different size brushes.

11. The apparatus set forth in claim 1, the middle toolbox module further comprises dividers extending from a bottom and side surfaces of the interior of the middle toolbox module that provide separate compartments for storing supplies.

12. The apparatus set forth in claim 11, a compartment cover configured to be removably attached to the dividers and enclose an area between the dividers.

13. The apparatus set forth in claim 1, further comprising a tool tray sized to engage support ribs of the bottom toolbox module.

14. The apparatus set forth in claim 1, the pair of wheels are removably attached to the bottom toolbox module and replaceable.

15. The apparatus set forth in claim 1, the top toolbox module further comprises a metal plate molded therein, and portable light magnetically coupled with the metal plate.

16. The apparatus set forth in claim 1, wherein the brush hanging bar in the interior of the middle toolbox module has a dual tab configuration that occupies two spaces around a support rib.

17. The apparatus set forth in claim 1, further comprising:
- a plurality of bottom anchor points molded onto an exterior surface of the bottom toolbox module;
- a plurality of middle anchor points molded onto an exterior surface of the middle toolbox module; and
- a plurality of top anchor points molded onto an exterior surface of the top toolbox module.

18. The apparatus set forth in claim 1, the top toolbox module lid comprises a plurality of bins, at least one of the plurality of bins further comprises a removably attached cover.

19. An apparatus, comprising:
- a bottom toolbox module;
- a middle toolbox module configured to mount on top of the bottom module;
- a top toolbox module configured to mount on top of the middle toolbox module;

the bottom toolbox module comprises a pair of wheels, an interior, a bottom toolbox module lid, a telescoping handle, and an extension pole holder;

the pair of wheels are removably attached to the bottom toolbox module and replaceable;

the interior of the bottom toolbox module comprises support ribs configured to hold a first brush hanging bar;

a bottom toolbox module handle pivotally mounted onto the bottom toolbox module;

the bottom toolbox module lid comprises a plurality of cup holders;

a tool tray sized to engage support ribs of the bottom toolbox module;

the middle toolbox module comprises an interior and a middle toolbox module lid;

the interior of the middle toolbox module comprises support ribs configured to hold a second brush hanging bar;

the middle toolbox module further comprises dividers extending from a bottom and side surfaces that provide separate compartments for storing supplies;

a compartment cover configured to be removably attached to the dividers and enclose an area between the dividers;

the middle toolbox module lid comprises a plurality of cup holders;

the first and second brush hanging bar has hooks attached thereto;

wherein the hooks on the first and second brush hanging bars are spaced at various distances to hold different size brushes;

the top toolbox module comprises an interior and a top toolbox module lid, the top toolbox module lid having a metal plate molded therein and portable light magnetically coupled with the metal plate;

a plurality of bottom anchor points molded onto an exterior surface of the bottom toolbox module;

a plurality of middle anchor points molded onto an exterior surface of the middle toolbox module;

a plurality of top anchor points molded onto an exterior surface of the top toolbox module;

the top toolbox module lid comprises a first surface with a plurality of bins, at least one of the plurality of bins further comprises a removably attached cover; and the top toolbox module lid is configured to hold a predefined size paint can and comprises a plurality of cup holders on a second surface.

20. An apparatus, comprising:

a bottom toolbox module;

a middle toolbox module configured to mount on top of the bottom toolbox module;

a top toolbox module configured to mount on top of the middle toolbox module the bottom toolbox module comprises a pair of wheels, an interior, a bottom toolbox module lid and a telescoping extension handle;

the middle toolbox module comprises a middle toolbox module lid and an interior;

the top toolbox module comprises a top toolbox module lid, an interior, a metal plate molded therein, and portable light magnetically coupled with the metal plate;

the interior of the middle toolbox module comprises a plurality of support ribs; and the interior of the middle toolbox module a brush hanging bar with hooks configured to mount between two of the plurality of support ribs.

21. An apparatus, comprising:

a bottom toolbox module;

a middle toolbox module configured to mount on top of the bottom toolbox module;

a top toolbox module configured to mount on top of the middle toolbox module the bottom toolbox module comprises a pair of wheels, an interior, a bottom toolbox module lid and a telescoping extension handle;

the middle toolbox module comprises a middle toolbox module lid and an interior;

the top toolbox module comprises a top toolbox module lid and an interior;

the interior of the middle toolbox module comprises a plurality of support ribs;

the interior of the middle toolbox module a brush hanging bar with hooks configured to mount between two of the plurality of support ribs a plurality of bottom anchor points molded onto an exterior surface of the bottom toolbox module;

a plurality of middle anchor points molded onto an exterior surface of the middle toolbox module; and a plurality of top anchor points molded onto an exterior surface of the top toolbox module.

* * * * *